United States Patent
Matsumoto

(10) Patent No.: US 10,266,716 B2
(45) Date of Patent: *Apr. 23, 2019

(54) METHOD FOR MANUFACTURING COLORED PARTICLE DISPERSION

(71) Applicant: KAO CORPORATION, Tokyo (JP)

(72) Inventor: Yuuta Matsumoto, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/322,339

(22) PCT Filed: Jul. 1, 2015

(86) PCT No.: PCT/JP2015/069067
§ 371 (c)(1),
(2) Date: Dec. 27, 2016

(87) PCT Pub. No.: WO2016/002860
PCT Pub. Date: Jan. 7, 2016

(65) Prior Publication Data
US 2017/0152393 A1    Jun. 1, 2017

(30) Foreign Application Priority Data

Jul. 4, 2014   (JP) ................. 2014-138927

(51) Int. Cl.
| | |
|---|---|
| *C09D 17/00* | (2006.01) |
| *C09D 11/326* | (2014.01) |
| *B41J 2/01* | (2006.01) |
| *C09B 48/00* | (2006.01) |
| *B41M 5/00* | (2006.01) |
| *C09D 11/322* | (2014.01) |

(52) U.S. Cl.
CPC ............. *C09D 17/001* (2013.01); *B41J 2/01* (2013.01); *B41M 5/00* (2013.01); *C09B 48/00* (2013.01); *C09D 11/322* (2013.01); *C09D 11/326* (2013.01); *C09D 17/00* (2013.01)

(58) Field of Classification Search
None
See application file for complete search history.

(56) References Cited

U.S. PATENT DOCUMENTS

| | | | | |
|---|---|---|---|---|
| 4,771,086 A | * | 9/1988 | Martin ................. | B01J 13/18 523/137 |
| 6,031,084 A | * | 2/2000 | Kondo ................. | C07C 245/04 524/190 |
| 6,136,490 A | * | 10/2000 | Ogawa .............. | G03G 9/09321 430/109.3 |
| 7,253,216 B2 | | 8/2007 | Miyabayashi | |
| 9,879,148 B2 | * | 1/2018 | Matsumoto .......... | C09D 17/001 |
| 2003/0027071 A1 | | 2/2003 | Tazawa et al. | |
| 2003/0195274 A1 | | 10/2003 | Nakamura et al. | |
| 2004/0229974 A1 | | 11/2004 | Miyabayashi | |
| 2005/0075416 A1 | | 4/2005 | Miyabayashi | |
| 2007/0227401 A1 | | 10/2007 | Ganschow et al. | |
| 2015/0030977 A1 | * | 1/2015 | Farrugia ............. | G03G 9/0806 430/109.3 |
| 2015/0361285 A1 | * | 12/2015 | Breton ................. | C09D 11/38 347/20 |
| 2016/0304735 A1 | | 10/2016 | Matsumoto | |
| 2017/0199472 A1 | * | 7/2017 | Morales-Tirado ... | G03G 9/0804 |

FOREIGN PATENT DOCUMENTS

| | | | | |
|---|---|---|---|---|
| EP | 1125760 A1 | | 8/2001 | |
| EP | 1321495 A1 | | 6/2003 | |
| JP | 01108554 A | * | 4/1989 | ......... G03G 9/08702 |
| JP | 2002-338859 A | | 11/2002 | |
| JP | 2003-43751 A | | 2/2003 | |
| JP | 2003-261605 A | | 9/2003 | |
| JP | 2003-306611 A | | 10/2003 | |
| JP | 2004-155818 A | | 6/2004 | |
| JP | 2005-97476 A | | 4/2005 | |
| JP | 2005-97517 A | | 4/2005 | |
| JP | 2006-8734 A | | 1/2006 | |
| JP | 2007-197525 A | | 8/2007 | |
| JP | 2007-534810 A | | 11/2007 | |
| JP | 2007334005 A | * | 12/2007 | |
| JP | 2015-113458 A | | 6/2015 | |

OTHER PUBLICATIONS

Machine translation of JP 01108554 A, retrieved May 2018. (Year: 2018).*
Machine translation of JP 2007334005 A, retrieved May 2018. (Year: 2018).*
International Search Report, issued in PCT/JP2015/069067, PCT/ISA/210, dated Oct. 6, 2015.
Extended European Search Report issued in European Application No. 15815628.1 dated Oct. 27, 2017.

* cited by examiner

*Primary Examiner* — Nicole M. Buie-Hatcher
(74) *Attorney, Agent, or Firm* — Birch, Stewart, Kolasch & Birch, LLP

(57) ABSTRACT

The present invention provides [1] a process for producing a colored fine particle dispersion including the step of subjecting a dispersion including a pigment, a polymerizable monomer, a surfactant, a polymerization initiator and water to emulsion polymerization, the pigment being a pigment having a quinacridone skeleton; the surfactant being an anionic or nonionic surfactant; and the polymerization initiator including an anionic or nonionic azo-based compound, [2] a colored fine particle dispersion including colored fine particles having an average particle size of not less than 10 nm and not more than 300 nm, and [3] a process for producing a water-based ink for ink-jet printing, including the step of mixing the obtained colored fine particle dispersion and an organic solvent B.

15 Claims, No Drawings

METHOD FOR MANUFACTURING COLORED PARTICLE DISPERSION

FIELD OF THE INVENTION

The present invention relates to a process for producing a colored fine particle dispersion, the colored fine particle dispersion, and a process for producing a water-based ink for ink-jet printing which includes the colored fine particle dispersion.

BACKGROUND OF THE INVENTION

In ink-jet printing methods, droplets of ink are directly projected onto a recording medium from very fine nozzles and allowed to adhere to the recording medium to form characters or images. The ink-jet printing methods have become rapidly spread because of various advantages such as easiness of full coloration, low cost, capability of using a plain paper as the recording medium, non-contact with printed characters or images, etc. In recent years, in order to impart good weathering resistance and good water resistance to printed materials, an ink containing a pigment as a colorant has been extensively used.

Further, for the purpose of stably compounding a pigment in a water-based ink, colored fine particles prepared by encapsulating the pigment with a polymer have been developed.

For example, JP 2003-306611A discloses a process for producing a microencapsulated pigment capable of producing an ink for ink-jet printing which can satisfy all of requirements (1) to (6) including (1) excellent dispersion stability; (2) excellent ejection stability from a print head; (3) capability of procuring printed materials having images with excellent fastness; (4) capability of procuring printed materials having images with high optical density; (5) capability of procuring printed materials having images with excellent scratch resistance; and (6) capability of procuring printed materials having characters or images with high color developability which hardly suffer from ink bleeding even when using a plain paper as a recording medium, in which the pigment particles having a hydrophilic group on a surface thereof are coated with a polymer by an emulsion polymerization method.

In addition, JP 2003-261605A discloses a sulfuric acid salt containing an alkylene group having 5 to 18 carbon atoms, or an alkoxymethylethylene group and an alkylene group having 2 to 4 carbon atoms, as a polymerizable surfactant capable of providing a polymer emulsion that has good stability during polymerization thereof or provides a polymer coating film having good properties such as good water resistance.

SUMMARY OF THE INVENTION

The present invention relates to the following aspects [1] to [3].

[1] A process for producing a colored fine particle dispersion including the step of subjecting a dispersion including a pigment, a polymerizable monomer, a surfactant, a polymerization initiator and water to emulsion polymerization, the pigment being a pigment having a quinacridone skeleton;

the surfactant being an anionic or nonionic surfactant; and the polymerization initiator including an anionic or nonionic azo-based compound.

[2] A colored fine particle dispersion produced by the process described in the above aspect [1], including colored fine particles having an average particle size of not less than 10 nm and not more than 300 nm; and

[3] A process for producing a water-based ink for ink-jet printing, including the step of mixing the colored fine particle dispersion produced by the process described in the above aspect [1] and an organic solvent B.

DETAILED DESCRIPTION OF THE INVENTION

In the production process described in JP 2003-306611A, although a pigment dispersion using an azo-based pigment among magenta pigments can be produced without any significant problems, there tends to arise such a problem that if a pigment having a quinacridone skeleton is used in the dispersion, it may be difficult to obtain a pigment dispersion suitably used in a water-based ink for ink-jet printing, because the polymerization reaction hardly proceeds even by controlling an amount of a polymerization initiator used therein, or gels are undesirably formed in the dispersion.

The present invention relates to a process for producing a colored fine particle dispersion suitably used for a water-based ink for ink-jet printing which can be produced by an emulsion polymerization method even when using a pigment having a quinacridone skeleton, is excellent in storage stability, and can provide printed characters or images having excellent rub fastness when printed on a recording medium; the colored fine particle dispersion; and a process for producing a water-based ink for ink-jet printing which includes the colored fine particle dispersion.

The present inventors have found that by subjecting a dispersion including a pigment having a quinacridone skeleton, a polymerizable monomer, an anionic or nonionic surfactant and an anionic or nonionic azo-based polymerization initiator to emulsion polymerization, it is possible to produce a colored fine particle dispersion suitably used for a water-based ink for ink-jet printing which is excellent in storage stability and can provide printed characters or images having excellent rub fastness when printed on a recording medium.

That is, the present invention relates to the following aspects [1] to [3].

[1] A process for producing a colored fine particle dispersion including the step of subjecting a dispersion including a pigment, a polymerizable monomer, a surfactant, a polymerization initiator and water to emulsion polymerization, the pigment being a pigment having a quinacridone skeleton;

the surfactant being an anionic or nonionic surfactant; and the polymerization initiator including an anionic or nonionic azo-based compound.

[2] A colored fine particle dispersion produced by the process described in the above aspect [1], including colored fine particles having an average particle size of not less than 10 nm and not more than 300 nm; and

[3] A process for producing a water-based ink for ink-jet printing, including the step of mixing the colored fine particle dispersion produced by the process described in the above aspect [1] and an organic solvent B.

In accordance with the present invention, there are provided a process for producing a colored fine particle dispersion suitably used for a water-based ink for ink-jet printing in which the colored fine particle dispersion can be produced by an emulsion polymerization method even when using a pigment having a quinacridone skeleton, and the ink obtained therefrom is excellent in storage stability and can provide printed characters or images having excellent rub fastness when printed on a recording medium; the colored fine particle dispersion; and a process for producing a water-based ink for ink-jet printing which includes the colored fine particle dispersion.

[Process for Producing Colored Fine Particle Dispersion]

The production process of the present invention relates to a process for producing a colored fine particle dispersion which includes the step of subjecting a dispersion including a pigment, a polymerizable monomer, a surfactant, a polymerization initiator and water to emulsion polymerization, in which the pigment is a pigment having a quinacridone skeleton; the surfactant is an anionic or nonionic surfactant; and the polymerization initiator includes an anionic or nonionic azo-based compound. The "colored fine particles" as used herein mean particles obtained by coating pigment particles with a polymer.

In accordance with the present invention, it is possible to produce a colored fine particle dispersion containing colored fine particles obtained by encapsulating a pigment having a quinacridone skeleton with a polymer in an industrially advantageous manner. The colored fine particle dispersion can exhibit excellent storage stability and is capable of providing printed characters or images having excellent rub fastness when printed on a recording medium. The reason why the above advantages or effects can be attained by the present invention is considered as follows though it is not clearly determined.

That is, since the quinacridone skeleton containing a carbonyl group adjacent to an aromatic ring is likely to entrap radicals generated from the polymerization initiator therein, it is estimated that there is a tendency of disturbing occurrence of the radical polymerization reaction near the pigment. On the other hand, the azo-based polymerization initiator has lower attacking properties than, e.g., a persulfate-based polymerization initiator, and it is therefore estimated that the azo-based polymerization initiator selectively attacks the polymerizable monomer rather than the pigment onto a surface of which the anionic or nonionic surfactant is adsorbed, so that even the pigment having a quinacridone skeleton can maintain high polymerization reactivity.

In addition, by using the anionic or nonionic azo-based polymerization initiator in combination with the anionic or nonionic surfactant, it becomes possible to obtain a dispersion having excellent dispersibility without suffering from aggregation thereof. For this reason, the resulting colored fine particle dispersion exhibits excellent dispersion stability, and the water-based ink obtained therefrom therefore exhibits not only excellent storage stability but also excellent film-forming properties. As a result, it is considered that when drying the water-based ink, it becomes possible to obtain printed characters or images having excellent rub fastness.

In the following, the respective components used in the present invention as well as production methods thereof are explained.

<Pigment>

The pigment used in the present invention is a pigment having a quinacridone skeleton, and is represented by the following general formula (A).

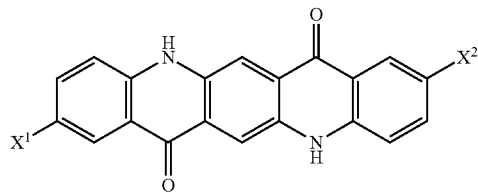

wherein $X^1$ and $X^2$ are each independently a hydrogen atom, an alkyl group, an alkoxy group or a halogen atom.

Examples of the alkyl group represented by $X^1$ and $X^2$ in the general formula (A) include alkyl groups having 1 to 10 carbon atoms such as a methyl group, a butyl group, an octyl group, a dodecyl group, a nonadecyl group, a cyclobutyl group, a cyclopentyl group, a cyclohexyl group, a methylcyclohexyl group and an ethylcyclohexyl group. Of these alkyl groups, preferred are alkyl groups having 1 to 8 carbon atoms, more preferred are alkyl groups having 1 to 3 carbon atoms, and even more preferred is a methyl group.

Examples of the alkoxy group represented by $X^1$ and $X^2$ in the general formula (A) include alkoxy groups having 1 to 8 carbon atoms. Of these alkoxy groups, preferred are alkoxy groups having 1 to 3 carbon atoms, and more preferred is a methoxy group.

Examples of the halogen atom represented by $X^1$ and $X^2$ in the general formula (A) include a fluorine atom, a chlorine atom, a bromine atom, etc. Of these halogen atoms, preferred is a chlorine atom.

Specific examples of the pigment having a quinacridone skeleton include C.I. Pigment Red 122, 192, 202, 207 and 209, C.I. Pigment Violet 19, etc. Of these pigments, preferred is at least one pigment selected from the group consisting of C.I. Pigment Red 122 and C.I. Pigment Violet 19.

The pigment having a quinacridone skeleton used in the present invention is preferably a pigment subjected to no hydrophilic treatment from the viewpoint of uniformly coating the surface of the pigment with a polymer. When using the pigment subjected to no hydrophilic treatment, it is considered that the polymer produced upon the emulsion polymerization is likely to be adsorbed onto the surface of the pigment particles, so that it is possible to obtain a colored fine particle dispersion containing colored fine particles formed by more uniformly coating the pigment with the polymer.

Meanwhile, the hydrophilic treatment of the pigment as used herein means the treatment in which at least one anionic hydrophilic functional group such as a carboxy group or at least one cationic hydrophilic functional group such as an ammonium group is bonded onto the surface of the pigment either directly or through the other atom group. Examples of the other atom group used above include an alkanediyl group having 1 to 24 carbon atoms, a substituted or unsubstituted phenylene group and a substituted or unsubstituted naphthylene group, etc.

In the present invention, the pigment having a quinacridone skeleton may be used in combination with conventionally known magenta pigments, inorganic pigments and organic pigments unless the advantages or effects of the present invention are adversely affected.

Examples of the inorganic pigments include carbon blacks and metal oxides.

Examples of the organic pigment include azo pigments, diazo pigments, phthalocyanine pigments, isoindolinone pigments, dioxazine pigments, perylene pigments, perinone pigments, thioindigo pigments, anthraquinone pigments and quinophthalone pigments.

<Polymerizable Monomer>

The polymerizable monomer used in the present invention includes a hydrophobic vinyl-based monomer. Meanwhile, the term referred to merely as a "polymerizable monomer" as used in the present invention is intended to mean the monomer excluding the below-mentioned polymerizable surfactant. However, actually, in the below-mentioned emulsion polymerization, the polymerizable surfactant may be incorporated into the polymer by copolymerizing with the polymerizable monomer.

The term "hydrophobic" of the hydrophobic vinyl-based monomer as used in the present invention means that the amount of the monomer that can be dissolved in 100 g of ion-exchanged water as measured at 25° C. is less than 10 g.

As the hydrophobic vinyl-based monomer, there may be mentioned those monomers containing at least a hydrophobic group and a polymerizable group in their structure. Examples of the hydrophobic group include at least one group selected from the group consisting of an aliphatic hydrocarbon group, an alicyclic hydrocarbon group and an aromatic hydrocarbon group. Examples of the polymerizable group include at least one group selected from the group consisting of a vinyl group, an allyl group, an acryloyl group, a methacryloyl group, a propenyl group, a vinylidene group and a vinylene group.

Examples of the hydrophobic vinyl-based monomer include at least one compound selected from the group consisting of a (meth)acrylic acid ester and an aromatic ring-containing hydrophobic monomer.

The term "(meth)acrylic acid ester" as used herein means at least one compound selected from the group consisting of an acrylic acid ester and a methacrylic acid ester, and the term "(meth)" as described hereinafter has the same meaning as defined above.

Specific examples of the (meth)acrylic acid ester include acrylic acid esters containing an alkyl group having not less than 1 and not more than 10 carbon atoms and preferably not less than 1 and not more than 8 carbon atoms, such as methyl acrylate, ethyl acrylate, propyl acrylate and 2-ethylhexyl acrylate; and methacrylic acid esters containing an alkyl group having not less than 1 and not more than 10 carbon atoms and preferably not less than 1 and not more than 8 carbon atoms, such as methyl methacrylate, ethyl methacrylate, propyl methacrylate and 2-ethylhexyl methacrylate.

Of these (meth)acrylic acid esters, preferred is at least one compound selected from the group consisting of methyl acrylate, ethyl acrylate, methyl methacrylate, ethyl methacrylate, 2-ethylhexyl acrylate and 2-ethylhexyl methacrylate.

As the aromatic ring-containing hydrophobic monomer, there may be mentioned a styrene-based monomer, an aromatic group-containing (meth)acrylate, etc.

Examples of the styrene-based monomer include styrene, 2-methyl styrene, etc. Examples of the aromatic group-containing (meth)acrylate include benzyl (meth)acrylate, phenoxyethyl (meth)acrylate, etc. Of these compounds, preferred are styrene and benzyl (meth)acrylate, and more preferred is benzyl (meth)acrylate.

The content of the hydrophobic monomer in the polymerizable monomer is preferably not less than 70% by mass, more preferably not less than 80% by mass, even more preferably not less than 90% by mass, further even more preferably not less than 93% by mass and still further even more preferably not less than 95% by mass, and is also preferably not more than 100% by mass, more preferably not more than 99% by mass and even more preferably not more than 98% by mass, from the viewpoint of improving dispersion stability of the colored fine particle dispersion as well as storage stability of the resulting water-based ink.

The polymerizable monomer preferably includes an ionic monomer. Examples of the ionic monomer include at least one anionic monomer selected from the group consisting of carboxylic acid monomers, sulfonic acid monomers and phosphoric acid monomers, and a cationic monomer. Of these polymerizable monomers, from the viewpoint of improving dispersion stability of the colored fine particle dispersion as well as rub fastness of the printed characters or images, preferred is at least one anionic monomer selected from the group consisting of carboxylic acid monomers, sulfonic acid monomers and phosphoric acid monomers.

Specific examples of the carboxylic acid monomers include (meth)acrylic acid, crotonic acid, itaconic acid, maleic acid, fumaric acid, citraconic acid and 2-methacryloyloxymethylsuccinic acid. Specific examples of the sulfonic acid monomers include styrenesulfonic acid, 2-acrylamido-2-methylpropanesulfonic acid and 3-sulfopropyl (meth)acrylate. Specific examples of the phosphoric acid monomers include vinylphosphonic acid, vinyl phosphate, bis(methacryloxyethyl)phosphate, diphenyl-2-acryloyloxyethyl phosphate and diphenyl-2-methacryloyloxyethyl phosphate.

Among these ionic monomers, preferred are the carboxylic acid monomers, more preferred is (meth)acrylic acid, and even more preferred is methacrylic acid.

The content of the ionic monomer in the polymerizable monomer is preferably not less than 0% by mass, more preferably not less than 0.1% by mass, even more preferably not less than 1% by mass and further even more preferably not less than 2% by mass, and is also preferably not more than 20% by mass, more preferably not more than 15% by mass, even more preferably not more than 10% by mass, further even more preferably not more than 7% by mass and still further even more preferably not more than 5% by mass, form the viewpoint of improving dispersion stability of the colored fine particle dispersion as well as storage stability of the resulting water-based ink.

The polymerizable monomer may further contain the other monomer, if required. Examples of the other monomer include polyethylene glycol mono(meth)acrylate, methoxy polyethylene glycol mono(meth)acrylate, octoxy polyethylene glycol mono(meth)acrylate and stearoyloxy polyethylene glycol mono(meth)acrylate.

Specific examples of the commercially available products of these monomers include "NK ESTER M-90G", "NK ESTER M-230G", "NK ESTER M-450G" and "NK ESTER M-900G" all available from Shin-Nakamura Chemical Co., Ltd., and "LIGHT ESTER 041MA" available from Kyoeisha Chemical Co., Ltd.

<Surfactant>

The surfactant used in the present invention is in the form of an anionic or nonionic surfactant, and an emulsifier for emulsion polymerization may be used as the surfactant.

Examples of the anionic surfactant include at least one compound selected from the group consisting of fatty acid salts, alkylbenzenesulfonic acid salts, polyoxyethylene alkylphenylethersulfuric acid ester salts, polyoxyethylene aralkylarylethersulfuric acid ester salts and polyoxyethylene alkylethersulfuric acid ester salts. Of these anionic surfactants, preferred is at least one compound selected from the group consisting of fatty acid salts, alkylbenzenesulfonic acid salts, polyoxyethylene alkylphenylethersulfuric acid ester salts, polyoxyethylene aralkylarylethersulfuric acid ester salts and polyoxyethylene alkylethersulfuric acid ester salts, and more preferred are polyoxyethylene alkylethersulfuric acid ester salts.

Examples of the nonionic surfactant include at least one compound selected from the group consisting of polyoxyethylene alkyl phenyl ethers, polyoxyethylene aralkyl aryl ethers and polyoxyethylene alkyl ethers.

The surfactant preferably includes a polymerizable surfactant as at least a part thereof. More specifically, it is preferred that the surfactant contains a polymerizable surfactant.

The polymerizable surfactant as used in the present invention means those surfactants referred to as a "reactive surfactant" which are capable of being copolymerized with an ethylenically unsaturated monomer, and includes anionic or nonionic polymerizable surfactants (emulsifiers) containing at least one radical-polymerizable unsaturated double bond in a molecule thereof. Examples of the polymerizable surfactant include sulfosuccinic acid ester-based surfactants, alkylphenolether-based surfactants and polyoxyethylene-based surfactants. Of these polymerizable surfactants, preferred is at least one surfactant selected from the group consisting of sulfosuccinic acid ester-based surfactants, alkylphenolether-based surfactants and polyoxyethylene-based surfactants.

Specific examples of commercially available products of the polymerizable surfactant include "ADEKA REASOAP" available from ADEKA Corporation, "AQUALON" available from DSK Co., Ltd., "ELEMINOL JS" and "ELEMINOL RS" both available from Sanyo Chemical Industries Ltd., and "LATEMUL PD" available from Kao Corporation.

The polymerizable surfactant used in the present invention is preferably an anionic polymerizable surfactant, more preferably at least one compound selected from the group consisting of compounds represented by the following general formula (I) and the following general formula (II), and even more preferably a compound (A) represented by the general formula (I) (hereinafter also referred to merely as a "compound (A)") from the viewpoint of improving rub fastness of the resulting printed characters or images.

Meanwhile, in the present specification, the "anionic polymerizable surfactant" as used herein means a polymerizable surfactant containing a functional group that can exhibit anionic properties, such as a carboxy group, a sulfonic acid group and a sulfuric acid group. However, surfactants containing both a functional group that can exhibit anionic properties and a functional group that can exhibit cationic properties are classified into amphoteric surfactants, and are therefore excluded from the above anionic polymerizable surfactants.

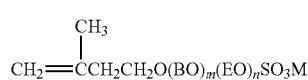

(I)

wherein BO is a butyleneoxy group; EO is an ethyleneoxy group; M is a cation; m represents an average molar number of addition of BO, and is a number of not less than 1 and not more than 10; and n represents an average molar number of addition of EO, and is a number of not less than 4 and not more than 25.

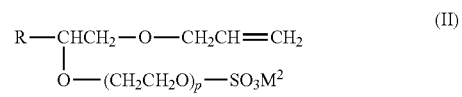

(II)

wherein $M^2$ is a cation; R is a hydrocarbon group having not less than 8 and not more than 14 carbon atoms; and p represents an average molar number of addition of $(CH_2CH_2O)$, and is a number of not less than 4 and not more than 15.

Examples of the butyleneoxy group represented by BO in the formula (I) include a butane-1,2-diyloxy group, a butane-1,3-diyloxy group and a tetramethyleneoxy group. Of these butyleneoxy groups, preferred is a butane-1,2-diyloxy group.

The symbol m in the formula (I) which represents an average molar number of addition of BO is preferably not less than 2, more preferably not less than 3 and even more preferably not less than 4, and is also preferably not more than 9, more preferably not more than 8 and even more preferably not more than 7.

The symbol n in the formula (I) which represents an average molar number of addition of EO is preferably not less than 5, more preferably not less than 7, even more preferably not less than 9, further even more preferably not less than 11 and still further even more preferably not less than 13, and is also preferably not more than 23, more preferably not more than 21, even more preferably not more than 19 and further even more preferably not more than 17.

In the formula (I), $(BO)_m$ and $(EO)_n$ are block-bonded to each other in this order.

As the cation represented by M in the formula (I), there may be mentioned at least one cation selected from the group consisting of alkali metals such as lithium, sodium and potassium; alkali earth metal ions such as calcium; a magnesium ion; an ammonium group; and organic ammonium groups such as a monomethyl ammonium group, a dimethyl ammonium group, a trimethyl ammonium group, a monoethyl ammonium group, a diethyl ammonium group, a triethyl ammonium group, a monomethanol ammonium group, a dimethanol ammonium group and a trimethanol ammonium group. Of these cations, from the viewpoint of improving dispersion stability of the colored fine particle dispersion, monovalent cations are preferred, and an ammonium group is more preferred.

The compound (A) represented by the formula (I) may be produced by conventionally known methods, for example, by the method of adding 1,2-butyleneoxide to 3-methyl-3-buten-1-ol and then adding ethyleneoxide to the obtained reaction product to obtain an ether alcohol, sulfating the obtained ether alcohol with a sulfating agent, and neutralizing the sulfated reaction product with a basic substance. Examples of the sulfating agent include chlorosulfonic acid, sulfuric anhydride and amidosulfuric acid. Of these sulfating agents, from the viewpoint of suppressing side reactions such as an addition reaction of the sulfuric acid group to the double bond group and an isomerization reaction of the double bond group, the amidosulfuric acid is preferably used.

The number of carbon atoms in the hydrocarbon group represented by R in the formula (II) is not less than 8. From the viewpoint of improving rub fastness of the obtained printed characters or images, the number of carbon atoms in R is preferably not less than 10, and is also not more than 14 and preferably not more than 12.

The symbol p in the formula (II) which represents an average molar number of addition of ($CH_2CH_2O$) is not less than 4. From the viewpoint of improving rub fastness of the obtained printed characters or images, p is preferably not less than 5, and is also not more than 15 and preferably not more than 12.

As the cation represented by $M^2$ in the formula (II), there may be mentioned at least one cation selected from the group consisting of alkali metals such as lithium, sodium and potassium; alkali earth metal ions such as calcium; a magnesium ion; an ammonium group; and organic ammonium groups such as a monomethyl ammonium group, a dimethyl ammonium group, a trimethyl ammonium group, a monoethyl ammonium group, a diethyl ammonium group, a triethyl ammonium group, a monomethanol ammonium group, a dimethanol ammonium group and a trimethanol ammonium group. Of these cations, from the viewpoint of improving dispersion stability of the colored fine particle dispersion, monovalent cations are preferred, and an ammonium group is more preferred.

<Polymerization Initiator>

The polymerization initiator used in the present invention is in the form of an anionic or nonionic azo-based compound. From the viewpoint of reducing coarse particles in the resulting colored fine particle dispersion, the polymerization initiator is preferably an anionic azo-based compound, and more preferably an anionic azo-based compound containing a carboxy group as the anionic functional group.

Examples of the anionic azo-based compound include at least one carboxy group-containing azo compound selected from the group consisting of azobiscarboxylic acids having 8 to 16 carbon atoms, such as 1,1'-azobis(cyclohexane-1-carboxylic acid), azobiscyanocarboxylic acids having 8 to 16 carbon atoms, such as 4,4'-azobis(4-cyanovaleric acid), 2,2'-azobis(4-cyanovaleric acid) and 4,4'-azobis(2-cyanopentanoic acid), and salts of these acids.

Of these anionic azo-based compounds, preferred is at least one compound selected from the group consisting of azobiscyanocarboxylic acids having 10 to 14 carbon atoms and salts of these acids, and more preferred is at least one compound selected from the group consisting of 4,4'-azobis(4-cyanovaleric acid) and salts thereof.

Examples of the nonionic azo-based compound include hydroxy group-containing azoamide compounds such as 2,2'-azobis[2-methyl-N-[1,1'-bis(hydroxymethyl)-2-hydroxyethyl]propionamide], 2,2'-azobis[2-methyl-N-[1,1'-bis(hydroxymethyl)ethyl]propionamide] and 2,2'-azobis[2-methyl-N-(2-hydroxyethyl)propionamide].

Of these compounds, preferred is at least one hydroxy group-containing azoamide compound selected from the group consisting of 2,2'-azobis[2-methyl-N-[1,1'-bis(hydroxymethyl)-2-hydroxyethyl]propionamide], 2,2'-azobis[2-methyl-N-[1,1-bis(hydroxymethyl)ethyl]propionamide] and 2,2'-azobis[2-methyl-N-(2-hydroxyethyl)propionamide], and more preferred is 2,2'-azobis[2-methyl-N-(2-hydroxyethyl)propionamide].

In the present invention, the anionic or nonionic azo-based compound as the polymerization initiator may be used in combination with a conventionally known anionic polymerization initiator unless the advantages or effects of the present invention are adversely affected.

Examples of the conventionally known polymerization initiator include persulfates such as potassium persulfate and ammonium persulfate; inorganic peroxides such as hydrogen peroxide; alkyl peracids such as t-butyl permaleic acid and isobutyl peracetic acid; and sulfinic acid-containing peroxides. Further, if required, the anionic polymerization initiator may be used together with organic peroxides such as t-butyl hydroperoxide, benzoyl peroxide and cumene hydroperoxide. In addition, as the polymerization initiator, there may also be used redox-based polymerization initiators formed of a combination of the peroxide with a reducing agent such as sodium sulfite, rongalite and ascorbic acid.

In the emulsion polymerization in the present invention, a chain transfer agent may also be used. Examples of the chain transfer agent include mercaptans such as n-dodecyl mercaptan, t-dodecyl mercaptan and n-octyl mercaptan; xanthogens such as dimethyl xanthogen disulfide and diisobutyl xanthogen disulfide; and dipentene, indene, 1,4-cyclohexadiene, dihydrofuran and xanthene.

<Water>

In the present invention, water is used as a dispersing medium for the emulsion polymerization.

The proportion of water to a whole amount of the dispersing medium is preferably not less than 50% by mass, more preferably not less than 65% by mass, even more preferably not less than 75% by mass and further even more preferably not less than 80% by mass.

From the viewpoint of improving dispersibility of the pigment, the dispersing medium may also contain, in addition to water, an optional organic solvent.

Examples of the organic solvent that may be used in the dispersing medium include alcohols having not less than 1 and not more than 6 carbon atoms, ketones, ethers, amides, aromatic hydrocarbons and aliphatic hydrocarbons having not less than 5 and not more than 10 carbon atoms. Of these organic solvents, preferred are oxygen atom-containing polar solvents having not less than 1 and not more than 5 carbon atoms. Specific examples of the organic solvent include methanol, ethanol, acetone and methyl ethyl ketone. Of these organic solvents, from the viewpoint of improving rub fastness of the printed characters or images, preferred is methyl ethyl ketone.

The proportion between water and the organic solvent in the dispersing medium is not particularly limited. From the viewpoint of improving storage stability of the resulting ink, the weight ratio of the organic solvent to water (organic solvent/water) is preferably not less than 0.05, more preferably not less than 0.08, even more preferably not less than 0.10 and further even more preferably not less than 0.12, and is also preferably not more than 0.40, more preferably not more than 0.35, even more preferably not more than 0.30 and further even more preferably not more than 0.25.

<Emulsion Polymerization>

The emulsion polymerization in the present invention may be carried out by subjecting the dispersion including the pigment, the polymerizable monomer, the surfactant, the polymerization initiator and water to emulsion polymerization, and is preferably accomplished by the process including the following steps 1 and 2:

Step 1: dispersing a mixed solution including the pigment, the polymerizable surfactant and water to prepare a dispersion; and Step 2: subjecting the dispersion and the polymerizable monomer to emulsion polymerization in the presence of the surfactant and the polymerization initiator to obtain the colored fine particle dispersion.

(Step 1: Dispersion)

In the step 1, the mixed solution including the pigment, the polymerizable surfactant and water is dispersed to prepare the dispersion.

The amount of the polymerizable surfactant used in the step 1 is preferably not less than 1% by mass, more preferably not less than 5% by mass and even more preferably not less than 8% by mass, and is also preferably not more than 50% by mass, more preferably not more than 30% by mass and even more preferably not more than 20% by mass, on the basis of the pigment. When the amount of the polymerizable surfactant used in the step 1 is not less than 1% by mass, the pigment is excellent in dispersion stability, and it is therefore possible to obtain a uniform pigment dispersion containing pigment particles having a small particle size. When the amount of the polymerizable surfactant used in the step 1 is not more than 50% by mass, it is possible to prevent formation of particles constituted of only the polymer that adsorbs no pigment, and suppress increase in viscosity of the resulting ink upon concentration of the ink which tends to cause ejection defects, etc.

The whole amount of the polymerizable surfactant used in the step 1 is preferably not less than 0.5 part by mass, more preferably not less than 1.0 part by mass, even more preferably not less than 3.0 parts by mass and further even more preferably not less than 5.0 parts by mass, and is also preferably not more than 40 parts by mass, more preferably not more than 30 parts by mass, even more preferably not more than 20 parts by mass and further even more preferably not more than 15 parts by mass, on the basis of 100 parts by mass of the polymerizable monomer being present upon the emulsion polymerization, from the viewpoint of conducting the emulsion polymerization in a stable manner, reducing a residual amount of the polymerizable surfactant and obtaining the printed characters or images having excellent rub fastness.

(Dispersion Treatment)

In the step 1, there may be used various conventionally known dispersers. Examples of the dispersers include high-speed stirring mixers such as disperse and homomixers, kneading machines such as roll mills, kneaders and extruders, high-pressure dispersers such as high-pressure homogenizers, media-type dispersers such as paint shakers and beads mills, and mixing and stirring devices such as anchor blades. These dispersers may be used in combination of any two or more thereof.

Of these dispersers, from the viewpoint of uniformly dispersing the pigment in water, high-speed stirring mixers such as dispers and homomixers and media-type dispersers such as paint shakers and beads mills are preferably used. Examples of the commercially available high-speed stirring mixers include "Ultra Disper" available from Asada Iron Works Co., Ltd., and "ROBOMIX" available from PRIMIX Corporation. Examples of the commercially available media-type dispersers include "Ultra Apex Mill" available from Kotobuki Industries Co., Ltd., and "Pico Mill" available from Asada Iron Works Co., Ltd.

When using the media-type dispersers, the material of dispersing media thereof is preferably a ceramic material such as zirconia and titania, a polymer material such as polyethylene and nylon, a metal, etc. Of these materials, from the viewpoint of good abrasion resistance, zirconia is more preferred. In addition, from the viewpoint of sufficiently atomizing the pigment, the diameter of the media is preferably not less than 0.003 mm and more preferably not less than 0.01 mm, and is also preferably not more than 0.5 mm and more preferably not more than 0.4 mm.

The dispersing time is preferably not less than 0.3 hour and more preferably not less than 1 hour from the viewpoint of sufficiently atomizing the pigment, and is also preferably not more than 200 hours and more preferably not more than 50 hours from the viewpoint of enhancing production efficiency of the pigment dispersion.

From the viewpoint of atomizing the pigment particles, the dispersion treatment in the step 1 preferably includes a high-pressure dispersion treatment. More specifically, it is preferred that after subjecting the mixed solution containing the pigment, the polymerizable surfactant and water to dispersion treatment, the resulting dispersion is further subjected to high-pressure dispersion treatment to obtain the dispersion, and it is more preferred that after subjecting the mixed solution to dispersion treatment using a high-speed stirring mixer or a media-type disperser, the resulting dispersion is further subjected to high-pressure dispersion treatment to obtain the dispersion.

The term "high-pressure dispersion" as used herein means that the dispersion treatment is conducted under a pressure of not less than 20 MPa. The dispersing pressure is preferably not less than 50 MPa, more preferably not less than 100 MPa and even more preferably not less than 130 MPa from the viewpoint of wetting the surface of the pigment with the polymerizable surfactant to uniformly disperse the pigment in the resulting dispersion. Also, from the viewpoint of good operating properties in the dispersion treatment, the dispersing pressure is preferably not more than 250 MPa and more preferably not more than 200 MPa The number of passes through the disperser upon the high-pressure dispersion treatment is preferably not less than 2, more preferably not less than 3, even more preferably not less than 5, further even more preferably not less than 7 and still further even more preferably not less than 9 from the viewpoint of wetting the surface of the pigment with the polymerizable surfactant to uniformly disperse the pigment in the resulting dispersion. Also, from the viewpoint of good dispersion treatment efficiency, the number of passes through the disperser upon the high-pressure dispersion treatment is not more than 20. The operation method of the disperser upon the high-pressure dispersion treatment may be either a circulating method or a continuous method. Among these operation methods, from the viewpoint of suppressing occurrence of distribution of the dispersion condition owing to the number of passes through the disperser, preferred is a continuous method.

As the high-pressure dispersers used in the present invention, there may be mentioned homo-valve-type high-pressure homogenizers such as typically "High-Pressure Homogenizer" (tradename) available from Izumi Food Machinery Co., Ltd., and chamber-type high-pressure homogenizers such as "MICROFLUIDIZER" (tradename) available from Microfluidics Corp., "Nanomizer" (tradename) available from Yoshida Kikai Co., Ltd., and "Ultimaizer" and "Star Burst" (tradenames) both available from Sugino Machine Ltd. Of these dispersers, preferred are chamber-type high-pressure homogenizers such as "MICROFLUIDIZER" (tradename), "Nanomizer" (tradename), and "Ultimaizer" and "Star Burst" (tradenames).

The temperature of the dispersion upon the high-pressure dispersion treatment is not particularly limited, and is preferably from 5 to 80° C.

The method for carrying out the step 1 in the present invention is not particularly limited as long as it is the method in which the mixed solution including the pigment, the polymerizable surfactant and water is dispersed to prepare the dispersion. However, in the case of using an optional organic solvent in addition to water as the dispersing medium, the step 1 is preferably conducted by the following step 1':

Step 1': dispersing a mixed solution including the pigment, the polymerizable surfactant, water and an organic solvent to prepare a dispersion and then removing the organic solvent from the dispersion.

(Removal of Organic Solvent)

When removing the organic solvent from the dispersion including the organic solvent, the resin can be prevented from being coalesced together in the step 2, and it is therefore possible to obtain a colored fine particle dispersion containing the dispersed particles having a small particle size.

Examples of an apparatus used for removing the organic solvent include a thin film distillation apparatus such as a batch simple distillation device, a reduced pressure distillation device and a flush evaporator, a rotary distillation device and a stirring evaporator. Among these apparatuses, from the viewpoint of efficiently removing the organic solvent from the dispersion, preferred are a rotary distillation device and a stirring evaporator. In the case where the organic solvent is removed at one time from the dispersion treatment product that is obtained in an amount as small as not more than 5 kg, the rotary distillation device is preferably used, whereas in the case where the organic solvent is removed at one time from the dispersion treatment product that is obtained in an amount as large as more than 5 kg, the stirring evaporator is preferably used. Among the rotary distillation devices, more preferred is a rotary reduced-pressure distillation device such as a rotary evaporator, and among the stirring evaporators, more preferred is a stirring tank thin film evaporator.

The temperature of the dispersion treatment product upon removing the organic solvent therefrom may be appropriately selected according to the kind of organic solvent to be removed. The temperature of the dispersion treatment product upon removing the organic solvent therefrom under reduced pressure is preferably not lower than 20° C., more preferably not lower than 25° C. and even more preferably not lower than 30° C., and is also preferably not higher than 80° C., more preferably not higher than 70° C. and even more preferably not higher than 65° C.

The pressure used upon removal of the organic solvent is preferably not less than 0.01 MPa, more preferably not less than 0.02 MPa and even more preferably not less than 0.05 MPa, and is also preferably not more than 0.5 MPa, more preferably not more than 0.2 MPa and even more preferably not more than 0.1 MPa.

The time required for removal of the organic solvent is preferably not less than 1 hour, more preferably not less than 2 hours and even more preferably not less than 5 hours, and is also preferably not more than 24 hours, more preferably not more than 12 hours and even more preferably not more than 10 hours.

The removal of the organic solvent is conducted until the solid content of the dispersion from which the organic solvent is removed reaches preferably not less than 18% by mass, more preferably not less than 20% by mass and even more preferably not less than 22% by mass, and also preferably not more than 60% by mass, more preferably not more than 40% by mass and even more preferably not more than 30% by mass.

The content of the pigment in the dispersion from which the organic solvent is removed is preferably not less than 5% by mass, more preferably not less than 10% by mass and even more preferably not less than 15% by mass, from the viewpoint of attaining good coloring properties of the resulting ink, and is also preferably not more than 40% by mass, more preferably not more than 35% by mass and even more preferably not more than 30% by mass, from the viewpoint of maintaining good dispersion stability of the pigment in the dispersion.

The content of the polymerizable surfactant in the dispersion from which the organic solvent is removed is preferably not less than 0.1% by mass, more preferably not less than 0.5% by mass and even more preferably not less than 1.0% by mass, from the viewpoint of maintaining good dispersion stability of the pigment in the dispersion, and is also preferably not more than 30% by mass, more preferably not more than 20% by mass, even more preferably not more than 10% by mass and further even more preferably not more than 5.0% by mass, form the viewpoint of uniformly coating the pigment with the polymer in the emulsion polymerization step.

(Step 2: Emulsion Polymerization)

In the step 2, the dispersion and the polymerizable monomer are subjected to emulsion polymerization in the presence of the surfactant and the polymerization initiator to obtain the colored fine particle dispersion.

The polymerization initiator may be added before the step 2. However, from the viewpoint of avoiding a fear of causing polymerization of the polymerizable surfactant prior to the step 2, it is preferred that the polymerization initiator is added in the step 2.

The emulsion polymerization as used in the present invention means the method in which the polymerizable monomer is emulsified or dispersed in the dispersing medium containing water as a main component in the presence of the surfactant, and polymerized using the polymerization initiator.

In the emulsion polymerization in the present invention, the anionic or nonionic surfactant is used. The surfactant includes the aforementioned polymerizable surfactant used in the step 1. From the viewpoint of improving dispersion stability of the particles in the colored fine particle dispersion, a surfactant is further added in the step 2.

The surfactant acts for providing a polymerization field by emulsification and suspension of the polymerizable monomer as well as formation of micelles thereof, and for improving dispersion stability of the particles in the colored fine particle dispersion, etc. The surfactant for emulsifying the polymerizable monomer upon the emulsion polymerization preferably includes a polymerizable surfactant. The polymerizable surfactant may be the same polymerizable surfactant as contained in the dispersion obtained in the step 1. Since the polymerizable surfactant contains at least one radical-polymerizable unsaturated double bond in a molecule thereof, the polymerizable surfactant is copolymerized with the polymerizable monomer and incorporated into the resulting polymer, so that it is possible to produce the colored fine particle dispersion having excellent dispersion stability.

The amount of the polymerizable monomer used in the emulsion polymerization is preferably not less than 1% by mass, more preferably not less than 10% by mass and even more preferably not less than 15% by mass, on the basis of the whole reaction system used in the emulsion polymerization reaction, from the viewpoint of obtaining the printed characters or images having excellent rub fastness, and is also preferably not more than 60% by mass, more preferably not more than 40% by mass and even more preferably not more than 25% by mass, on the basis of the whole reaction system used in the emulsion polymerization reaction, from the viewpoint of suppressing increase in viscosity of the resulting ink when concentrated.

The mass ratio of the polymerizable monomer to the pigment (polymerizable monomer/pigment) upon the emulsion polymerization is preferably from 90/10 to 10/90, more preferably from 80/20 to 20/80 and even more preferably from 75/25 to 40/60, from the viewpoint of suppressing increase in viscosity of the resulting ink when concentrated.

The emulsion polymerization in the present invention is not particularly limited as long as it is the method of conducting the emulsion polymerization in the presence of the pigment, the surfactant and the polymerizable monomer including the hydrophobic vinyl-based monomer. However, the emulsion polymerization is preferably conducted by the following step 2'.

(Step 2')

Step 2': mixing the dispersion containing the polymerizable surfactant with the polymerizable monomer including the hydrophobic vinyl-based monomer to subject the resulting mixture to emulsion polymerization.

In the dispersion used in the step 2', the pigment particles are dispersed in the solvent containing water as a main component, and the polymerizable surfactant containing a hydrophilic group, a hydrophobic group and a polymerizable group is allowed to coexist with the pigment particles. When mixing the dispersion with the polymerizable monomer including the hydrophobic vinyl-based monomer to copolymerize the polymerizable group of the polymerizable surfactant with the polymerizable group of the polymerizable monomer in the presence of the polymerization initiator, it is possible to produce the colored fine particle dispersion containing the pigment coated with the polymer.

In the emulsion polymerization in the present invention, as the surfactant, the aforementioned polymerizable surfactant may be used in combination with the other surfactant. The proportion of the polymerizable surfactant used in the emulsion polymerization is preferably not less than 5% by mass, more preferably not less than 20% by mass and even more preferably not less than 40% by mass, and is also not more than 100% by mass, on the basis of a whole amount of the surfactants used therein (polymerizable surfactant+the other surfactant).

The polymerizable monomer may be added by known methods such as a monomer dropwise addition method, a monomer batch charging method and a pre-emulsion method. Of these methods, from the viewpoint of attaining good polymerization stability, the pre-emulsion method is preferably used. The pre-emulsion method is the method in which a pre-emulsion prepared by previously mixing and emulsifying the polymerizable monomer, the surfactant and water is added dropwise to the dispersion.

More specifically, there may be mentioned the method including the step of conducting the emulsion polymerization while introducing an emulsion containing the polymerizable monomer, the surfactant as an emulsifier and water into a solution containing the dispersion.

From the viewpoint of suppressing formation of coarse particles, the pre-emulsion is prepared using a rotary stirring device. The rotating speed of the rotary stirring device is preferably not less than 200 rpm and more preferably not less than 300 rpm, and is also preferably not more than 5000 rpm, more preferably not more than 2000 rpm and even more preferably not more than 1000 rpm. The stirring time is preferably not less than 10 minutes and more preferably not less than 30 minutes.

In the pre-emulsion method, the time of the dropwise addition of the pre-emulsion is preferably not less than 0.5 hour and more preferably not less than 1 hour from the viewpoint of obtaining emulsified particles having a uniform particle size in the resulting emulsion, and is also preferably not more than 8 hours and more preferably not more than 6 hours from the viewpoint of improving reactivity of the emulsion polymerization. The aging time is preferably not less than 0.5 hour and more preferably not less than 1 hour, and is also preferably not more than 5 hours and more preferably not more than 4 hours.

The polymerization temperature used upon the emulsion polymerization may be appropriately controlled according to a decomposition temperature of the polymerization initiator, and is preferably not lower than 50° C., more preferably not lower than 60° C. and even more preferably not lower than 70° C. from the viewpoint of improving reactivity of the emulsion polymerization, and is also preferably not higher than 90° C. and more preferably not higher than 85° C. from the viewpoint of improving the molecular weight distribution of the resulting polymer.

The polymerization atmosphere is preferably a nitrogen atmosphere or an atmosphere of an inert gas such as argon from the viewpoint of improving reactivity of the emulsion polymerization.

The amount of the polymerization initiator used is preferably not less than 0.01 part by mass, more preferably not less than 0.05 part by mass, even more preferably not less than 0.1 part by mass, further even more preferably not less than 0.5 part by mass, still further even more preferably not less than 1 part by mass and still further even more preferably not less than 2 parts by mass, and is also preferably not more than 6 parts by mass, more preferably not more than 5 parts by mass and even more preferably not more than 4 parts by mass, on the basis of 100 parts by mass of the polymerizable monomer, from the viewpoint of obtaining printed characters or images having excellent rub fastness.

[Colored Fine Particle Dispersion]

The colored fine particle dispersion according to the present invention is in the form of a dispersion prepared by dispersing the colored fine particles constituted of the pigment and the polymer containing the constitutional unit derived from the polymerizable monomer including the hydrophobic vinyl-based monomer in a dispersing medium containing water as a main medium. The colored fine particle dispersion according to the present invention can be used as a coloring material for a water-based ink for ink-jet printing which includes the colored fine particle dispersion. In this case, the configuration of the colored fine particles in the colored fine particle dispersion is preferably composite particles formed by coating at least the pigment with the polymer. Examples of the configuration of the colored fine particles in the colored fine particle dispersion include the particle configuration in which the pigment is enclosed within the respective polymer particles, the particle configuration in which the pigment is uniformly dispersed in the respective polymer particles, the particle configuration in which the pigment is exposed onto a surface of the respective polymer particles, and the like.

The average particle size of the colored fine particles in the colored fine particle dispersion is preferably not less than 10 nm, more preferably not less than 30 nm, even more preferably not less than 40 nm, further even more preferably not less than 50 nm, still further even more preferably not less than 60 nm, still further even more preferably not less than 75 nm and still further even more preferably not less than 80 nm, and is also preferably not more than 300 nm, more preferably not more than 200 nm, even more preferably not more than 160 nm, further even more preferably not more than 150 nm, still further even more preferably not more than 140 nm and still further even more preferably not more than 130 nm, from the viewpoint of suppressing increase in viscosity of the resulting ink when concentrated and improving rub fastness of the printed characters or images when printed on a recording medium.

Meanwhile, the average particle size of the colored fine particles may be measured by the method described in Examples below.

The content (solid content) of the colored fine particles in the colored fine particle dispersion is preferably not less than 10% by mass, more preferably not less than 15% by mass, even more preferably not less than 20% by mass and further even more preferably not less than 25% by mass, and is also preferably not more than 60% by mass, more preferably not more than 55% by mass, even more preferably not more than 50% by mass and further even more preferably not more than 40% by mass, form the viewpoint of stably emulsifying and dispersing the emulsified particles.

The content of the pigment in the colored fine particle dispersion is preferably not less than 1.0% by mass, more preferably not less than 3.0% by mass and even more preferably not less than 5.0% by mass, and is also preferably not more than 40% by mass, more preferably not more than 30% by mass and even more preferably not more than 20% by mass, form the viewpoint of improving optical density of the resulting ink.

The content of the polymer in the colored fine particle dispersion is preferably not less than 1.0% by mass, more preferably not less than 5.0% by mass and even more preferably not less than 15% by mass, and is also preferably not more than 50% by mass, more preferably not more than 40% by mass and even more preferably not more than 30% by mass, form the viewpoint of improving rub fastness of the printed characters or images.

(Neutralizing Agent)

In the present invention, from the viewpoint of improving dispersion stability of the colored fine particles as well as storage stability of the resulting water-based ink, a neutralizing agent may be used, if required. When using the neutralizing agent, the pH value of the colored fine particle dispersion is preferably controlled to not less than 7 and more preferably not less than 7.5, and is also preferably controlled to not more than 11 and more preferably not more than 9.5.

Examples of the neutralizing agent include hydroxides of alkali metals, ammonia and organic amines.

Specific examples of the hydroxides of alkali metals include lithium hydroxide, sodium hydroxide, potassium hydroxide and cesium hydroxide. Among these hydroxides of alkali metals, preferred is sodium hydroxide.

Specific examples of the organic amines include trimethylamine, ethylamine, diethylamine, triethylamine and triethanolamine.

These neutralizing agents may be used alone or in the form of a mixture of any two or more thereof.

[Process for Producing Water-Based Ink for Ink-Jet Printing]

The process for producing a water-based ink for ink-jet printing according to the present invention includes the step of mixing the colored fine particle dispersion according to the present invention and an organic solvent B.

In the water-based ink obtained by the production process of the present invention, the colored fine particle dispersion according to the present invention is used as a colorant.

Examples of the compound used as the organic solvent B include at least one compound selected from the group consisting of polyhydric alcohols, polyhydric alcohol alkyl ethers, nitrogen-containing heterocyclic compounds, amides, amines and sulfur-containing compounds. Among these compounds, preferred is at least one compound selected from the group consisting of polyhydric alcohols and polyhydric alcohol alkyl ethers, and more preferred are polyhydric alcohols. The polyhydric alcohols may be used in the form of a mixture containing a plurality of compounds belonging to the concept of polyhydric alcohols, and the polyhydric alcohol alkyl ethers may also be used in the form of a mixture containing a plurality of compounds belonging to the concept of polyhydric alcohol alkyl ethers.

The content of the at least one compound selected from the group consisting of polyhydric alcohols and polyhydric alcohol alkyl ethers in the organic solvent B is preferably not less than 80% by mass, more preferably not less than 90% by mass, even more preferably not less than 95% by mass, further even more preferably substantially 100% by mass and still further even more preferably 100% by mass.

Examples of the polyhydric alcohols include ethylene glycol, diethylene glycol, triethylene glycol, polyethylene glycol, propylene glycol, dipropylene glycol and tripropylene glycol. Among these polyhydric alcohols, from the viewpoint of improving rub fastness of the printed characters or images, preferred is propylene glycol.

Examples of the polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, diethylene glycol monoisobutyl ether, triethylene glycol monomethyl ether, triethylene glycol monobutyl ether, triethylene glycol monoisobutyl ether, tetraethylene glycol monomethyl ether, propylene glycol monoethyl ether, dipropylene glycol monobutyl ether, dipropylene glycol monomethyl ether, tripropylene glycol monomethyl ether and tripropylene glycol monobutyl ether. Among these polyhydric alcohol alky ethers, from the viewpoint of improving rub fastness of the printed characters or images, preferred is diethylene glycol monoisobutyl ether.

The water-based ink may also be produced by further adding, in addition to the aforementioned organic solvent B, various ordinary additives such as a wetting agent, a penetrant, a dispersant, a surfactant, a viscosity controller, a defoaming agent, an antiseptic agent, a mildew-proof agent and a rust preventive to the colored fine particle dispersion.

The content of the pigment in the water-based ink is preferably not less than 1.0% by mass, more preferably not less than 1.5% by mass and even more preferably not less than 2.0% by mass, and is also preferably not more than 15% by mass, more preferably not more than 10% by mass and even more preferably not more than 6.0% by mass, from the viewpoint of improving optical density of the printed characters or images.

The content of the polymer in the water-based ink is preferably not less than 0.5% by mass, more preferably not less than 0.8% by mass, even more preferably not less than 1.0% by mass and further even more preferably not less than 2% by mass, and is also preferably not more than 30% by mass, more preferably not more than 20% by mass and even more preferably not more than 12% by mass, from the viewpoint of obtaining the printed characters or images having excellent rub fastness.

The content of water in the water-based ink for ink-jet printing is preferably not less than 20% by mass, more preferably not less than 30% by mass and even more preferably not less than 40% by mass, from the viewpoint of obtaining the printed characters or images having excellent rub fastness, and is also preferably not more than 70% by mass, more preferably not more than 65% by mass and even more preferably not more than 60% by mass, from the viewpoint of improving ejection properties of the water-based ink.

The mass ratio of the pigment to the polymer [pigment/polymer] in the water-based ink is preferably not less than 0.1, more preferably not less than 0.2 and even more preferably not less than 0.4, and is also preferably not more than 4.0, more preferably not more than 2.0 and even more preferably not more than 1.0, from the viewpoint of obtaining the printed characters or images having excellent rub fastness.

(Properties of Water-Based Ink)

The average particle size of the colored fine particles in the water-based ink is preferably not less than 10 nm, more preferably not less than 30 nm, even more preferably not less than 40 nm, further even more preferably not less than 50 nm, still further even more preferably not less than 60 nm, still further even more preferably not less than 75 nm and still further even more preferably not less than 80 nm, and is also preferably not more than 300 nm, more preferably not more than 200 nm, even more preferably not more than 160 nm, further even more preferably not more than 150 nm, still further even more preferably not more than 140 nm and still further even more preferably not more than 130 nm, from the viewpoint of improving rub fastness of the printed characters or images when printed on a recording medium.

Meanwhile, the average particle size of the particles in the water-based ink may be measured by the method described in Examples below.

The viscosity of the water-based ink as measured at 25° C. is preferably not less than 2.0 mPa·s, more preferably not less than 3.0 mPa·s and even more preferably not less than 4.0 mPa·s, and is also preferably not more than 12 mPa·s, more preferably not more than 9.0 mPa·s and even more preferably not more than 7.0 mPa·s, from the viewpoint of improving storage stability of the water-based ink and rub fastness of the printed characters or images.

Meanwhile, the viscosity at 25° C. of the water-based ink may be measured by the method described in Examples below.

The static surface tension of the water-based ink as measured at 20° C. is preferably not less than 20 mN/m and more preferably not less than 25 mN/m, and is also preferably not more than 50 mN/m, more preferably not more than 45 mN/m, even more preferably not more than 40 mN/m and further even more preferably not more than 35 mN/m, from the viewpoint of improving ejection properties of the water-based ink. Meanwhile, the static surface tension at 20° C. of the water-based ink may be measured by the method described in Examples below.

The pH value of the water-based ink is preferably not less than 7.0, more preferably not less than 7.5 and even more preferably not less than 8.0 from the viewpoint of improving storage stability of the water-based ink and improving rub fastness of the printed characters or images, and is also preferably not more than 11.0, more preferably not more than 10.0 and even more preferably not more than 9.5 from the viewpoint of improving resistance of members to the water-based ink and suppressing skin irritation. Meanwhile, the pH value of the water-based ink may be measured by the method described in Examples below.

(Ink-Jet Printing Method)

The water-based ink according to the present invention may be suitably used in an ink-jet printing method in which characters or images are printed on a recording medium such as a plain paper or an ink-jet paper. In addition, the water-based ink may also be suitably used in an ink-jet printing method in which characters or images are printed on a low-water absorbing recording medium such as a coated paper and a synthetic resin film, because of excellent rub fastness of the water-based ink.

The water absorption of the low-water absorbing recording medium used in the present invention as measured by contacting with pure water for 100 ms is preferably not less than 0 g/m$^2$, more preferably not less than 1.0 g/m$^2$ and even more preferably not less than 2.0 g/m$^2$ from the viewpoint of promoting drying of the printed characters or images and enhancing rub fastness of the printed characters or images, and is also preferably not more than 10 g/m$^2$, more preferably not more than 8.0 g/m$^2$, even more preferably not more than 6.0 g/m$^2$ and further even more preferably not more than 4.0 g/m$^2$ from the viewpoint of enhancing optical density and gloss of the printed characters or images. The water absorption may be measured by the method described in Examples below using an automatic scanning absorptometer.

As the low-water absorbing recording medium for ink-jet printing, there may be used a coated paper and a synthetic resin film.

Examples of the coated paper include "OK Topcoat+" (available from Oji Paper Co., Ltd.; basis weight: 104.7 g/m$^2$; 60° gloss: 49.0; water absorption as measured by contacting with pure water for 100 ms (hereinafter defined in the same way): 4.9 g/m$^2$), a multi-color foam gloss coated paper (available from Oji Paper Co., Ltd.; 104.7 g/m$^2$; 60° gloss: 36.8; water absorption: 5.2 g/m$^2$), "UPM Finesse Gloss" (available from UPM; 115 g/m$^2$; 60° gloss: 27.0; water absorption: 3.1 g/m$^2$), "UPM Finesse Matt" (available from UPM; 115 g/m$^2$; 60° gloss: 5.6; water absorption: 4.4 g/m$^2$), "TerraPress Silk" (available from Stora Enso; 80 g/m$^2$; 60° gloss: 6.0; water absorption: 4.1 g/m$^2$), and "LumiArt" (available from Stora Enso; 90 g/m$^2$; 60° gloss: 26.3).

Examples of the synthetic resin film include a polyester film, a vinyl chloride film, a polypropylene film, a polyethylene film and a nylon film. These films may be subjected to surface treatments such as corona treatment, etc., if required.

Examples of the generally available synthetic resin films include "LUMIRROR T60" (available from Toray Industries Inc.; polyethylene terephthalate; thickness: 125 µm; 60° gloss: 189.1; water absorption: 2.3 g/m$^2$), "PVC80B P" (available from Lintec Corp.; polyvinyl chloride; 60° gloss: 58.8; water absorption: 1.4 g/m$^2$), "KINATH KEE 70CA" (available from Lintec Corp.; polyethylene), "YUPO SG90 PAT1" (available from Lintec Corp.; polypropylene), and "BONYL RX" (available from Kohjin Film & Chemical Co., Ltd.; nylon).

With respect to the aforementioned embodiments, the present invention further provides the following aspects relating to the process for producing a colored fine particle dispersion, and the water-based ink including the colored fine particle dispersion produced by the process.

<1> A process for producing a colored fine particle dispersion including the step of subjecting a dispersion including a pigment, a polymerizable monomer, a surfactant, a polymerization initiator and water to emulsion polymerization, the pigment being a pigment having a quinacridone skeleton;

the surfactant being an anionic or nonionic surfactant; and the polymerization initiator including an anionic or nonionic azo-based compound.

<2> The process for producing a colored fine particle dispersion according to the aspect <1>, wherein the pigment is a pigment subjected to no hydrophilic treatment.

<3> The process for producing a colored fine particle dispersion according to the aspect <1> or <2>, wherein the pigment is at least one pigment selected from the group consisting of C.I. Pigment Red 122 and C.I. Pigment Violet 19.

<4> The process for producing a colored fine particle dispersion according to any one of the aspects <1> to <3>, wherein the polymerization initiator is at least one carboxy group-containing azo compound selected from the group consisting of an azobiscarboxylic acid having 8 to 16 carbon atoms, an azobiscyanocarboxylic acid having 8 to 16 carbon atoms and salts of these acids.

<5> The process for producing a colored fine particle dispersion according to any one of the aspects <1> to <3>, wherein the polymerization initiator is at least one compound selected from the group consisting of 4,4'-azobis(4-cyanovaleric acid) and salts thereof.

<6> The process for producing a colored fine particle dispersion according to any one of the aspects <1> to <3>, wherein the polymerization initiator is at least one hydroxy group-containing azoamide compound selected from the group consisting of 2,2'-azobis[2-methyl-N-[1,1'-bis(hydroxymethyl)-2-hydroxyethyl]propionamide], 2,2'-azobis[2-methyl-N-[1,1-bis(hydroxymethyl)ethyl]propionamide] and 2,2'-azobis[2-methyl-N-(2-hydroxyethyl)propionamide].

<7> The process for producing a colored fine particle dispersion according to any one of the aspects <1> to <3>, wherein the polymerization initiator is 2,2'-azobis[2-methyl-N-[1,1'-bis(hydroxymethyl)-2-hydroxyethyl]propionamide].

<8> The process for producing a colored fine particle dispersion according to any one of the aspects <1> to <7>, wherein the surfactant is at least one anionic surfactant selected from the group consisting of fatty acid salts, alkylbenzenesulfonic acid salts, polyoxyethylene alkylphenylethersulfuric acid ester salts, polyoxyethylene aralkylarylethersulfuric acid ester salts and polyoxyethylene alkylethersulfuric acid ester salts, and preferably polyoxyethylene alkylethersulfuric acid ester salt(s).

<9> The process for producing a colored fine particle dispersion according to any one of the aspects <1> to <7>, wherein the surfactant is at least one nonionic surfactant selected from the group consisting of polyoxyethylene alkyl phenyl ethers, polyoxyethylene aralkyl aryl ethers and polyoxyethylene alkyl ethers.

<10> The process for producing a colored fine particle dispersion according to any one of the aspects <1> to <9>, wherein the surfactant includes a polymerizable surfactant as at least a part thereof.

<11> The process for producing a colored fine particle dispersion according to the aspect <10>, wherein the polymerizable surfactant is at least one surfactant selected from the group consisting of sulfosuccinic acid ester-based surfactants, alkylphenolether-based surfactants and polyoxyethylene-based surfactants.

<12> The process for producing a colored fine particle dispersion according to the aspect <10> or <11>, wherein the polymerizable surfactant is at least one compound selected from the group consisting of compounds represented by the aforementioned general formula (I) and the aforementioned general formula (II).

<13> The process for producing a colored fine particle dispersion according to any one of the aspects <1> to <12>, wherein the polymerizable monomer includes a hydrophobic vinyl-based monomer that contains at least a hydrophobic group and a polymerizable group in a structure thereof, the hydrophobic group is at least one group selected from the group consisting of an aliphatic hydrocarbon group, an alicyclic hydrocarbon group and an aromatic hydrocarbon group, and the polymerizable group is at least one group selected from the group consisting of a vinyl group, an allyl group, an acryloyl group, a methacryloyl group, a propenyl group, a vinylidene group and a vinylene group.

<14> The process for producing a colored fine particle dispersion according to any one of the aspects <1> to <13>, wherein the hydrophobic vinyl-based monomer is at least one monomer selected from the group consisting of a (meth)acrylic acid ester and an aromatic ring-containing hydrophobic monomer.

<15> The process for producing a colored fine particle dispersion according to any one of the aspects <1> to <14>, wherein the polymerizable monomer includes an ionic monomer, and the ionic monomer is at least one anionic monomer selected from the group consisting of carboxylic acid monomers, sulfonic acid monomers and phosphoric acid monomers.

<16> The process for producing a colored fine particle dispersion according to any one of the aspects <1> to <15>, including the following steps 1 and 2:
Step 1: dispersing a mixed solution including the pigment, the polymerizable surfactant and the water to prepare a dispersion; and
Step 2: subjecting the dispersion and the polymerizable monomer to emulsion polymerization in the presence of the surfactant and the polymerization initiator to obtain the colored fine particle dispersion.

<17> The process for producing a colored fine particle dispersion according to the aspect <16>, wherein an amount of the polymerizable surfactant used is preferably not less than 1% by mass, more preferably not less than 5% by mass and even more preferably not less than 8% by mass, and is also preferably not more than 50% by mass, more preferably not more than 30% by mass and even more preferably not more than 20% by mass, on the basis of the pigment.

<18> The process for producing a colored fine particle dispersion according to the aspect <16> or <17>, wherein a whole amount of the polymerizable surfactant used is preferably not less than 0.5 part by mass, more preferably not less than 1.0 part by mass, even more preferably not less than 3.0 parts by mass and further even more preferably not less than 5.0 parts by mass, and is also preferably not more than 40 parts by mass, more preferably not more than 30 parts by mass, even more preferably not more than 20 parts by mass and further even more preferably not more than 15 parts by mass, on the basis of 100 parts by mass of the polymerizable monomer being present upon the emulsion polymerization.

<19> The process for producing a colored fine particle dispersion according to any one of the aspects <16> to <18>, wherein the step 1 includes a high-pressure dispersion treatment step.

<20> The process for producing a colored fine particle dispersion according to the aspect <19>, wherein the high-pressure dispersion treatment is conducted under a pressure of not less than 20 MPa, preferably not less than 50 MPa, more preferably not less than 100 MPa and even more preferably not less than 130 MPa, and also preferably not more than 250 MPa and more preferably not more than 200 MPa, and the number of passes through a dispersing apparatus upon the high-pressure dispersion treatment is preferably not less than 2, more preferably not less than 3, even more preferably not less than 5, further even more preferably not less than 7 and still further even more preferably not less than 9, and is also not more than 20.

<21> The process for producing a colored fine particle dispersion according to any one of the aspects <16> to <20>, wherein the step 1 includes the following step 1':

Step 1': dispersing a mixed solution including the pigment, the polymerizable surfactant, water and an organic solvent to prepare a dispersion and then removing the organic solvent from the dispersion.

<22> The process for producing a colored fine particle dispersion according to the aspect <21>, wherein the removal of the organic solvent is conducted until a solid content of the dispersion from which the organic solvent is removed reaches preferably not less than 18% by mass, more preferably not less than 20% by mass and even more preferably not less than 22% by mass, and also preferably not more than 60% by mass, more preferably not more than 40% by mass and even more preferably not more than 30% by mass.

<23> The process for producing a colored fine particle dispersion according to the aspect <21> or <22>, wherein a content of the polymerizable surfactant in the dispersion from which the organic solvent is removed is preferably not less than 0.1% by mass, more preferably not less than 0.5% by mass and even more preferably not less than 1.0% by mass, and is also preferably not more than 30% by mass, more preferably not more than 20% by mass, even more preferably not more than 10% by mass and further even more preferably not more than 5.0% by mass.

<24> The process for producing a colored fine particle dispersion according to any one of the aspects <16> to <23>, wherein the polymerization initiator is added in the step 2.

<25> The process for producing a colored fine particle dispersion according to any one of the aspects <16> to <24>, wherein a surfactant is further added in the step 2.

<26> The process for producing a colored fine particle dispersion according to any one of the aspects <16> to <25>, wherein an amount of the polymerizable monomer used in the emulsion polymerization is preferably not less than 1% by mass, more preferably not less than 10% by mass and even more preferably not less than 15% by mass, and is also preferably not more than 60% by mass, more preferably not more than 40% by mass and even more preferably not more than 25% by mass, on the basis of the whole reaction system used in the emulsion polymerization reaction.

<27> The process for producing a colored fine particle dispersion according to any one of the aspects <16> to <26>, wherein a mass ratio of the polymerizable monomer to the pigment (polymerizable monomer/pigment) upon the emulsion polymerization is preferably from 90/10 to 10/90, more preferably from 80/20 to 20/80 and even more preferably from 75/25 to 40/60.

<28> The process for producing a colored fine particle dispersion according to any one of the aspects <16> to <27>, wherein the step 2 includes the following step 2':

Step 2': mixing the dispersion containing the polymerizable surfactant with the polymerizable monomer including the hydrophobic vinyl-based monomer to subject the resulting mixture to emulsion polymerization.

<29> The process for producing a colored fine particle dispersion according to any one of the aspects <16> to <28>, wherein a proportion of the polymerizable surfactant used is preferably not less than 5% by mass, more preferably not less than 20% by mass and even more preferably not less than 40% by mass, and is also not more than 100% by mass, on the basis of a whole amount of the surfactants used therein (polymerizable surfactant+the other surfactant).

<30> A process for producing a water-based ink for ink-jet printing, including the step of mixing the colored fine particle dispersion produced by the process according to any one of the aspects <1> to <29> and an organic solvent B.

<31> The process for producing a water-based ink for ink-jet printing according to the aspect <30>, wherein the organic solvent B is at least one compound selected from the group consisting of polyhydric alcohols, polyhydric alcohol alkyl ethers, nitrogen-containing heterocyclic compounds, amides, amines and sulfur-containing compounds, preferably at least one compound selected from the group consisting of polyhydric alcohols and polyhydric alcohol alkyl ethers, and more preferably polyhydric alcohol(s).

<32> The process for producing a water-based ink for ink-jet printing according to the aspect <30> or <31>, wherein a content of the at least one compound selected from the group consisting of polyhydric alcohols and polyhydric alcohol alkyl ethers in the organic solvent B is preferably not less than 80% by mass, more preferably not less than 90% by mass, even more preferably not less than 95% by mass, further even more preferably substantially 100% by mass and still further even more preferably 100% by mass.

<33> A colored fine particle dispersion produced by the process according to any one of the aspects <1> to <29>, wherein the dispersion includes colored fine particles having an average particle size of not less than 10 nm and not more than 300 nm.

<34> The colored fine particle dispersion according to the aspect <33>, wherein a content (solid content) of the colored fine particles in the colored fine particle dispersion is preferably not less than 10% by mass, more preferably not less than 15% by mass, even more preferably not less than 20% by mass and further even more preferably not less than 25% by mass, and is also preferably not more than 60% by mass, more preferably not more than 55% by mass and even more preferably not more than 50% by mass.

<35> The colored fine particle dispersion according to the aspect <33> or <34>, wherein a content of the pigment in the colored fine particle dispersion is preferably not less than 1.0% by mass, more preferably not less than 3.0% by mass and even more preferably not less than 5.0% by mass, and is also preferably not more than 40% by mass, more preferably not more than 30% by mass and even more preferably not more than 20% by mass.

<36> A use of the colored fine particle dispersion according to any one of the aspects <33> to <35> as a colorant for a water-based ink for ink-jet printing.

EXAMPLES

In the following Production Examples, Examples and Comparative Examples, the "part(s)" and "%" indicate "part(s) by mass" and "% by mass", respectively, unless otherwise specified.

(1) Measurement of Average Particle Sizes of Dispersed Particles in Pigment Pre-Dispersion, Colored Fine Particle Dispersion and Water-Based Ink The average particle size of the dispersed particles in the respective dispersions and ink was measured using a laser particle analyzing system "ELS-8000" (cumulant analysis) available from Otsuka Electronics Co., Ltd. The measurement was conducted under the conditions including a temperature of 25° C., an angle between incident light and a detector of 90° and a cumulative number of 100 times, and a refractive index of water (1.333) was input to the analyzing system as a refractive index of the dispersing medium. In the measurement, the concentration of the dispersion was adjusted to 5×10⁻³% by mass (in terms of a solid content).

(2) Measurement of Solid Contents of Pigment Pre-Dispersion and Colored Fine Particle Dispersion Using an infrared moisture meter "FD-230" (tradename) available from Kett Electric Laboratory, 5 g of an aqueous dispersion was dried at a drying temperature of 150° C. under a measuring mode 96 (monitoring time: 2.5 minutes/variation range: 0.05%) to measure a water content on a wet base (% by mass) of the aqueous dispersion. The solid content of the aqueous dispersion was calculated according to the following formula:

Solid Content (% by mass)=100−Water Content on Wet Base (% by mass) of Aqueous Dispersion (3) Measurement of Amount of Colored Fine Particle Dispersion Allowed to Pass Through Filter The amount of the colored fine particle dispersion allowed to pass through a filter was measured to determine an amount of coarse particles present in the dispersion. The colored fine particle dispersion was subjected to filtration through a 25 mL-capacity needless syringe available from Terumo Corporation equipped with a filter "ACRO25LCF HDCII" having an average pore diameter of 10 μm available from Pall Corp., to measure an amount of the dispersion allowed to pass through the filter (amount (mL) filtered through the 10 μm-pore filter) until the one filter was clogged. The larger amount of the dispersion allowed to pass through the filter indicates that the amount of the coarse particles present in the dispersion is smaller. The "whole amount" shown in Tables means that no clogging of the filter was caused even when a whole amount (at least 400 mL) of the resulting colored fine particle dispersion was allowed to pass through the filter.

(4) Measurement of Viscosity of Water-Based Ink

The viscosity of the water-based ink was measured at 25° C. using an E-type viscometer "Model No. TV-25" (using a standard cone rotor (1°34'×R24); rotating speed: 50 rpm) available from Toki Sangyo Co., Ltd. The data obtained in this measurement were used as data for the below-mentioned storage stability test.

(5) Measurement of Static Surface Tension of Water-Based Ink

A platinum plate was dipped in 5 g of the water-based ink adjusted to a temperature of 20° C. and filled in a cylindrical polyethylene vessel (3.6 cm in diameter×1.2 cm in depth), and the static surface tension of the water-based ink was measured using a surface tension meter "CBVP-Z" available from Kyowa Interface Science Co., Ltd., by Wilhelmy method.

(6) Measurement of pH of Water-Based Ink

The pH value of the water-based ink at 25° C. was measured using a bench-top pH meter "F-71" available from Horiba Ltd., equipped with a pH electrode "6337-10D" available from Horiba Ltd.

(7) Water Absorption of Recording Medium

The water absorption of a recording medium as measured by contacting the recording medium with pure water for 100 ms was determined as follows. That is, using an automatic scanning liquid absorptometer "KM500win" available from Kumagai Riki Kogyo Co., Ltd., the amount of pure water transferred to the recording medium when allowing the recording medium to contact with pure water for 100 ms was measured at 23° C. under a relative humidity of 50%. The thus measured amount of pure water transferred to the recording medium was defined as a water absorption of the recording medium as measured by contacting with a pure water for 100 ms. The measuring conditions are shown below.

"Spiral Method"
Contact time: 0.010 to 1.0 (sec)
Pitch (mm): 7
Length Per Sampling (degree): 86.29
Start Radius (mm): 20
End Radius (mm): 60
Min Contact Time (ms): 10
Max Contact Time (ms): 1000
Sampling Pattern (1-50): 50
Number of Sampling Points (>0): 19
"Square Head"
Split Span (mm): 1
Split Width (mm): 5

Examples 1 to 6

Production of Colored Fine Particle Dispersion by Emulsion Polymerization

Pigment Pre-Dispersing Step: Step 1

A polyethylene vessel was charged with a polymerizable surfactant, ion-exchanged water, methyl ethyl ketone and a pigment "C.I. Pigment Red 122" (P.R. 122) as shown in "Charged Composition for Pigment Pre-Dispersion" in Table 1-1, and the contents of the polyethylene vessel were subjected to dispersion treatment using "ROBOMIX" available from PRIMIX Corporation equipped with a Homodisper at 7000 rpm for 1 hour while cooling in an ice bath at 0° C. Then, the obtained mixture was mixed with 90 parts by mass of ion-exchanged water, and subjected to dispersion treatment under a pressure of 150 MPa by passing through a disperser "MICROFLUIDIZER Model No. M-110EH-30XP" (tradename) available from Microfluidics Corporation 15 times. The resulting dispersion was diluted with ion-exchanged water until the solid content of the dispersion was reduced to 15% by mass.

Then, the thus obtained diluted dispersion was treated at 60° C. under reduced pressure using an evaporator to remove methyl ethyl ketone therefrom and concentrate the dispersion into a predetermined solid content, thereby obtaining a pigment dispersion (solid content: 25.0%). The average particle sizes of the particles in the thus obtained pre-dispersions PD-1 to PD-3 are shown in Table 1-1. Meanwhile, the pre-dispersion PD-1 was collectively produced in an amount capable of covering respective amounts thereof to be used in Examples 1 and 4 to 6 and Comparative Examples 1 to 3. The thus produced pre-dispersion PD-1 was divided into the respective necessary amounts and used in Examples 1 and 4 to 6 and Comparative Examples 1 to 3.

Emulsion Polymerization Step: Step 2

A glass vessel was charged with a vinyl-based monomer, an anionic surfactant for emulsion polymerization "LATEMUL E-118B" (tradename; sodium polyoxyethylene alkyl ether sulfate; solid content: 26% by mass) available from Kao Corporation, an anionic azo-based polymerization initiator "V-501" (tradename; 4,4'-azobis(4-cyanovaleric acid)) available from Wako Pure Chemical Industries, Ltd., and ion-exchanged water as shown in "Charged Composition for Pre-Emulsion" in Table 1-2, and the contents of the glass vessel were stirred using a Teflon (registered trademark) stirring blade at 500 rpm for 30 minutes, thereby obtaining a pre-emulsion.

A separable flask was charged with the pigment pre-dispersion and ion-exchanged water as shown in "Charged Composition for Colored Fine Particle Dispersion" in Table 1-3, and the contents of the flask were heated to 80° C. in a hot water bath while stirring at 250 rpm. After the temperature of the dispersion in the flask reached 80° C., a whole amount of the pre-emulsion previously prepared above as shown in Table 1-2 was added dropwise thereinto over 2 hours. After completion of the dropwise addition of the pre-emulsion, the resulting mixture was aged at 80° C. for 2 hours, thereby obtaining colored fine particle dispersions. Properties of the thus obtained colored fine particle dispersions are shown in Table 1-3.

The colored fine particles contained in the resulting respective colored fine particle dispersions were observed by a scanning electron microscope and a transmission electron microscope. As a result, it was confirmed that the pigment was coated with the polymer.

Example 7

The same procedure as in Example 1 was repeated except for using "C.I. Pigment Violet 19" (P.V. 19) in place of "C.I. Pigment Red 122" (P.R. 122), thereby obtaining a colored fine particle dispersion. Properties of the thus obtained colored fine particle dispersion are shown in Table 1-3.

Example 8

The same procedure as in Example 1 was repeated except that the amount of the anionic azo-based polymerization initiator "V-501" (tradename; 4,4'-azobis(4-cyanovaleric acid)) available from Wako Pure Chemical Industries, Ltd., added in the pigment pre-dispersing step was changed to that shown in Table 1-2, thereby obtaining a colored fine particle dispersion. Properties of the thus obtained colored fine particle dispersion are shown in Table 1-3.

Example 9

The same procedure as in Example 1 was repeated except that a nonionic azo-based polymerization initiator "VA-086" (tradename; 2,2'-azobis[2-methyl-N-(2-hydroxyethyl)propionamide]) available from Wako Pure Chemical Industries, Ltd., was used in the pigment pre-dispersing step in place of the anionic azo-based polymerization initiator "V-501" (tradename; 4,4'-azobis(4-cyanovaleric acid)) available from Wako Pure Chemical Industries, Ltd., thereby obtaining a colored fine particle dispersion. Properties of the thus obtained colored fine particle dispersion are shown in Table 1-3.

Comparative Examples 1 to 3

The same procedure as in Example 1 was repeated except that in Examples 1 to 6, respective polymerization initiators shown in Table 1-2 were used in the pigment pre-dispersing step in place of the anionic azo-based polymerization initiator "V-501" (tradename), thereby obtaining colored fine particle dispersions. Properties of the thus obtained colored fine particle dispersions are shown in Table 1-3.

In Table 1-3, "Unreacted" means that no polymerization reaction proceeded, and it was therefore not possible to conduct the measurement and evaluation, whereas "Formation of gels" means that gels were formed, and it was therefore not possible to conduct the measurement and evaluation.

Comparative Example 4

The same procedure as in Example 1 was repeated except that "C.I. Pigment Violet 19" (P.V. 19) was used in place of "C.I. Pigment Red 122" (P.R. 122), and the polymerization initiator shown in Table 1-2 was used in the pigment pre-dispersing step in place of the anionic azo-based polymerization initiator "V-501" (tradename), thereby obtaining a colored fine particle dispersion. Properties of the thus obtained colored fine particle dispersion are shown in Table 1-3.

Reference Examples 1 and 2

The same procedure as in Example 1 was repeated except that "C.I. Pigment Blue 15-3" (P.B. 15-3) or "C.I. Pigment Red 177" (P.R. 177) shown in Table 1-1 was used in place of "C.I. Pigment Red 122" (P.R. 122), and the respective polymerization initiators shown in Table 1-2 were used in the pigment pre-dispersing step in place of the anionic azo-based polymerization initiator "V-501" (tradename), thereby obtaining colored fine particle dispersions. Properties of the thus obtained colored fine particle dispersions are shown in Table 1-3.

TABLE 1-1

Charged Composition for Pigment Pre-Dispersion/Evaluation Results

| | | | No. of pigment pre-dispersion | | | | | |
|---|---|---|---|---|---|---|---|---|
| | | | PD-1 | PD-2 | PD-3 | PD-4 | PD-5 | PD-6 |
| Charged composition for pigment pre-dispersion | Polymerizable surfactant | kind*[1] | Compound (a) | KH-5 | KH-10 | Compound (a) | Compound (a) | Compound (a) |
| | | part(s) by mass | 444.0 | 35.6 | 35.6 | 444.0 | 444.0 | 444.0 |
| | Ion-exchanged water | part(s) by mass | 1963.0 | 927.6 | 927.6 | 1963.0 | 1963.0 | 1963.0 |
| | Methyl ethyl ketone | part(s) by mass | 348.0 | 139.2 | 139.2 | 348.0 | 348.0 | 348.0 |
| | Pigment (P.R. 122) | part(s) by mass | 800.0 | 320.0 | 320.0 | — | — | — |
| | Pigment (P.V. 19) | part(s) by mass | — | — | — | 800.0 | — | — |
| | Pigment (P.B. 15-3) | part(s) by mass | — | — | — | — | 800.0 | — |

TABLE 1-1-continued

Charged Composition for Pigment Pre-Dispersion/Evaluation Results

|  |  |  | No. of pigment pre-dispersion | | | | | |
|---|---|---|---|---|---|---|---|---|
|  |  |  | PD-1 | PD-2 | PD-3 | PD-4 | PD-5 | PD-6 |
|  | Pigment (P.R. 177) | part(s) by mass | — | — | — | — | — | 800.0 |
| Properties of pre-dispersion | Average particle size | nm | 110.0 | 112.0 | 109.0 | 127.0 | 97.5 | 109.5 |
|  | Solid content | % | 25.0 | 25.0 | 25.0 | 25.0 | 25.0 | 25.0 |

Note

*[1]Compound (a) was used in the form of an aqueous solution having a solid content of 20% by mass; KH-5 and KH-10 had a solid content of 100% by mass.

TABLE 1-2

Charged Composition for Pre-Emulsion

|  |  |  | No. of pre-emulsion | | | | |
|---|---|---|---|---|---|---|---|
|  |  |  | EC-1 | EC-2 | EC-3 | EC-4 | EC-5 |
| Charged composition for pre-emulsion*[2] | Methacrylic acid | part(s) by mass (mass %) | 1.88 (2.5) | 1.88 (2.5) | 1.88 (2.5) | 1.88 (2.5) | 1.88 (2.5) |
|  | Methyl methacrylate | part(s) by mass (mass %) | 26.25 (35.0) | 26.25 (35.0) | 26.25 (35.0) | 26.25 (35.0) | 26.25 (35.0) |
|  | Benzyl methacrylate | part(s) by mass (mass %) | 37.50 (50.0) | 37.50 (50.0) | 37.50 (50.0) | 37.50 (50.0) | 37.50 (50.0) |
|  | 2-Ethylhexyl acrylate | part(s) by mass (mass %) | 9.38 (12.5) | 9.38 (12.5) | 9.38 (12.5) | 9.38 (12.5) | 9.38 (12.5) |
|  | Anionic surfactant for emulsion polymerization | kind*[3] part(s) by mass | E-118B 8.65 | E-118B 8.65 | E-118B 8.65 | E-118B 8.65 | E-118B 8.65 |
|  | Polymerization initiator (V-501) | part(s) by mass | 2.25 | — | — | — | 2.25 |
|  | Polymerization initiator (VA-086) | part(s) by mass | — | — | — | — | — |
|  | Potassium persulfate (KPS) | part(s) by mass | — | 2.25 | — | — | — |
|  | Sodium persulfate (NaPS) | part(s) by mass | — | — | 2.25 | — | — |
|  | V-50 (cationic azo-based) | part(s) by mass | — | — | — | 2.25 | — |
|  | Ion-exchanged water | part(s) by mass | 34.85 | 34.85 | 34.85 | 34.85 | 34.85 |
|  | Amount of polymerization initiator used*[4] | part(s) by mass | 3.00 | 3.00 | 3.00 | 3.00 | 3.00 |

|  |  |  | No. of pre-emulsion | | | | |
|---|---|---|---|---|---|---|---|
|  |  |  | EC-6 | EC-7 | EC-8 | EC-9 | EC-10 |
| Charged composition for pre-emulsion*[2] | Methacrylic acid | part(s) by mass (mass %) | 1.88 (2.5) | 1.88 (2.5) | 1.88 (2.5) | 1.88 (2.5) | 1.88 (2.5) |
|  | Methyl methacrylate | part(s) by mass (mass %) | 26.25 (35.0) | 26.25 (35.0) | 26.25 (35.0) | 26.25 (35.0) | 26.25 (35.0) |
|  | Benzyl methacrylate | part(s) by mass (mass %) | 37.50 (50.0) | 37.50 (50.0) | 37.50 (50.0) | 37.50 (50.0) | 37.50 (50.0) |
|  | 2-Ethylhexyl acrylate | part(s) by mass (mass %) | 9.38 (12.5) | 9.38 (12.5) | 9.38 (12.5) | 9.38 (12.5) | 9.38 (12.5) |
|  | Anionic surfactant for emulsion polymerization | kind*[3] part(s) by mass | E-118B 8.65 | E-118B 8.65 | E118B 8.65 | E-118B 8.65 | E-118B 8.65 |
|  | Polymerization initiator (V-501) | part(s) by mass | 2.25 | 0.15 | 0.75 | 1.50 | 2.25 |
|  | Polymerization initiator (VA-086) | part(s) by mass | — | — | — | — | — |
|  | Potassium persulfate (KPS) | part(s) by mass | — | — | — | — | — |
|  | Sodium persulfate (NaPS) | part(s) by mass | — | — | — | — | — |
|  | V-50 (cationic azo-based) | part(s) by mass | — | — | — | — | — |
|  | Ion-exchanged water | part(s) by mass | 34.85 | 34.85 | 34.85 | 34.85 | 34.85 |
|  | Amount of polymerization initiator used*[4] | part(s) by mass | 3.00 | 0.20 | 1.00 | 2.00 | 3.00 |

TABLE 1-2-continued

Charged Composition for Pre-Emulsion

| | | | \multicolumn{5}{c}{No. of pre-emulsion} |
|---|---|---|---|---|---|---|---|

| | | | EC-11 | EC-12 | EC-13 | EC-14 | EC-15 |
|---|---|---|---|---|---|---|---|
| Charged composition for pre-emulsion*[2] | Methacrylic acid | part(s) by mass (mass %) | 1.88 (2.5) | 1.88 (2.5) | 1.88 (2.5) | 1.88 (2.5) | 1.88 (2.5) |
| | Methyl methacrylate | part(s) by mass (mass %) | 26.25 (35.0) | 26.25 (35.0) | 26.25 (35.0) | 26.25 (35.0) | 26.25 (35.0) |
| | Benzyl methacrylate | part(s) by mass (mass %) | 37.50 (50.0) | 37.50 (50.0) | 37.50 (50.0) | 37.50 (50.0) | 37.50 (50.0) |
| | 2-Ethylhexyl acrylate | part(s) by mass (mass %) | 9.38 (12.5) | 9.38 (12.5) | 9.38 (12.5) | 9.38 (12.5) | 9.38 (12.5) |
| | Anionic surfactant for emulsion polymerization | kind*[3] part(s) by mass | E-118B 8.65 | E-118B 8.65 | E-118B 8.65 | E-118B 8.65 | E118B 8.65 |
| | Polymerization initiator (V-501) | part(s) by mass | — | — | — | 6.75 | — |
| | Polymerization initiator (VA-086) | part(s) by mass | — | — | — | — | 2.25 |
| | Potassium persulfate (KPS) | part(s) by mass | 2.25 | 2.25 | 2.25 | — | — |
| | Sodium persulfate (NaPS) | part(s) by mass | — | — | — | — | — |
| | V-50 (cationic azo-based) | part(s) by mass | — | — | — | — | — |
| | Ion-exchanged water | part(s) by mass | 34.85 | 34.85 | 34.85 | 34.85 | 34.85 |
| | Amount of polymerization initiator used*[4] | part(s) by mass | 3.00 | 3.00 | 3.00 | 9.00 | 3.00 |

Note
*[2] The numeral values in parentheses indicate ratios based on a whole amount of the polymerizable monomer (mass %).
*[3] "E-118B" was used in the form of an aqueous solution having a solid content of 26% by mass.
*[4] Amount of the polymerization initiator used on the basis of 100 parts by mass of the polymerizable monomer.

TABLE 1-3

Charged Composition for Colored Fine Particle Dispersion/Evaluation Results

| | | | Example 1 | Comparative Example 1 | Comparative Example 2 | Comparative Example 3 | Example 2 |
|---|---|---|---|---|---|---|---|
| Charged composition | Pre-emulsion | No. | EC-1 | EC-2 | EC-3 | EC-4 | EC-5 |
| | Pigment pre-dispersion | No. | PD-1 | PD-1 | PD-1 | PD-1 | PD-2 |
| | | part(s) by mass | 300.0 | 300.0 | 300.0 | 300.0 | 300.0 |
| | Ion-exchanged water | part(s) by mass | 82.1 | 82.1 | 82.1 | 82.1 | 82.1 |
| Properties of colored fine particle dispersion obtained | Average particle size | nm | 124.7 | Unreacted | Unreacted | Formation of gels | 130.2 |
| | Solid content | % | 30.1 | 16.8 | 17.1 | 28.8 | 30.5 |
| | Amount of dispersion allowed to pass through 10 μm filter | mL | Whole amount | Unreacted | Unreacted | Formation of gels | Whole amount |

| | | | Example 3 | Example 4 | Example 5 | Example 6 | Example 7 |
|---|---|---|---|---|---|---|---|
| Charged composition | Pre-emulsion | No. | EC-6 | EC-7 | EC-8 | EC-9 | EC-10 |
| | Pigment pre-dispersion | No. | PD-3 | PD-1 | PD-1 | PD-1 | PD-4 |
| | | part(s) by mass | 300.0 | 300.0 | 300.0 | 300.0 | 300.0 |
| | Ion-exchanged water | part(s) by mass | 82.1 | 82.1 | 82.1 | 82.1 | 82.1 |
| Properties of colored fine particle dispersion obtained | Average particle size | nm | 129.9 | 129.2 | 127.3 | 129.8 | 145.2 |
| | Solid content | % | 30.2 | 29.2 | 30.1 | 30.5 | 30.2 |
| | Amount of dispersion allowed to pass through 10 μm filter | mL | Whole amount | 50 | 220 | 350 | Whole amount |

TABLE 1-3-continued

| Charged Composition for Colored Fine Particle Dispersion/Evaluation Results | | | Comparative Example 4 | Reference Example 1 | Reference Example 2 | Example 8 | Example 9 |
|---|---|---|---|---|---|---|---|
| Charged composition | Pre-emulsion | No. | EC-11 | EC-12 | EC-13 | EC-14 | EC-15 |
| | Pigment pre-dispersion | No. | PD-4 | PD-5 | PD-6 | PD-1 | PD-1 |
| | | part(s) by mass | 300.0 | 300.0 | 300.0 | 300.0 | 300.0 |
| | Ion-exchanged water | part(s) by mass | 82.1 | 82.1 | 82.1 | 82.1 | 82.1 |
| Properties of colored fine particle dispersion obtained | Average particle size | nm | Unreacted | 110.4 | 125.2 | 126.4 | 124.9 |
| | Solid content | % | 16.7 | 30.5 | 30.1 | 31.2 | 30.1 |
| | Amount of dispersion allowed to pass through 10 μm filter | mL | Unreacted | Whole amount | 280 | Whole amount | 330 |

From Table 1-3, it was confirmed that in the case of producing the colored fine particle dispersions using the pigment having a quinacridone skeleton, in Examples 1 to 9 in which the anionic or nonionic azo-based initiators were used, it was possible to obtain the colored fine particle dispersions by an emulsion polymerization method, whereas in Comparative Examples 1, 2 and 4 in which the persulfuric acid-based initiators were used, no reaction proceeded, and in Comparative Example 3 in which the cationic azo-based initiator was used, gels were formed, thereby failing to obtain a colored fine particle dispersion.

Meanwhile, the details of the polymerizable surfactants shown in Table 1-1 and Table 1-2 are as follows.

Compound (a): Compound represented by the following general formula (1) which was used in the form of a 20% by mass aqueous solution. The process for synthesizing the compound (a) is described in the below-mentioned Synthesis Example 1. The amount of the compound (a) is shown in terms of an amount of an aqueous solution thereof in Table 1-1 and Table 1-2.

(1)

wherein BO is a butyleneoxy group; and EO is an ethyleneoxy group.

Synthesis Example 1

A reaction vessel equipped with a stirrer, a thermometer and a dropping funnel was charged with 310 g (3.6 mol) of 3-methyl-3-buten-1-ol available from Tokyo Chemical Industry Co., Ltd., followed by cooling the contents of the reaction vessel to 10° C. in a nitrogen atmosphere. Then, 10.22 g (0.0723 mol) of a boron trifluoride diethyl ether complex available from Wako Pure Chemical Industries, Ltd., was added to the reaction vessel, and then 1557.94 g (21.6 mol) of 1,2-epoxybutane(butyleneoxide) was added dropwise to the reaction vessel at a temperature of 7 to 10° C. After completion of the dropwise addition, the contents of the reaction vessel were aged at 10° C. for 1 hour. In addition, 32.0 g of an adsorbent "KYOWAAD 500SH" available from Kyowa Chemical Industry Co., Ltd., was added to the reaction vessel, and the contents of the reaction vessel were stirred at room temperature for 1 hour, and then subjected to filtration under reduced pressure, thereby obtaining an adduct of 3-methyl-3-buten-1-ol with 6 mol of 1,2-epoxybutane.

The thus obtained adduct of 3-methyl-3-buten-1-ol with 6 mol of 1,2-epoxybutane was charged together with 7.26 g (0.134 mol) of powdery sodium methoxide into an autoclave, and then 2379 g (54 mol) of ethyleneoxide was added thereto at 130° C. under 0.3 MPa. Next, 84.7 g of a part of the resulting reaction mixture and 9.60 g of amidosulfuric acid were charged into a reaction vessel equipped with a stirrer and a thermometer, and reacted with each other at 120° C. for 90 minutes in a nitrogen atmosphere to obtain a sulfated reaction product. Then, the resulting reaction solution was subjected to filtration under pressure to remove the unreacted amidosulfuric acid therefrom, followed by diluting the resulting solution with ion-exchanged water to adjust a solid content thereof to 20% by mass, thereby obtaining an aqueous solution of the compound (a).

KH-5: "AQUALON KH-5" (tradename; solid content: 100% by mass) available from DSK Co., Ltd.; a mixture of a compound represented by the following general formula (2) in which R is an alkyl group having 10 carbon atoms and n is 5, and a compound represented by the following general formula (2) in which R is an alkyl group having 12 carbon atoms and n is 5.

KH-10: "AQUALON KH-10" (tradename; solid content: 100% by mass) available from DSK Co., Ltd.; a mixture of a compound represented by the following general formula (2) in which R is an alkyl group having 10 carbon atoms and n is 10, and a compound represented by the following general formula (2) in which R is an alkyl group having 12 carbon atoms and n is 10.

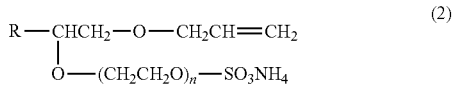

(2)

Examples 11 to 19 and Reference Examples 11 and 12

Production of Printing Ink

A glass vessel was charged with the colored fine particle dispersion, a 1N sodium hydroxide aqueous solution and ion-exchanged water as shown in Table 2, and the contents of the glass vessel were stirred for 10 minutes using a magnetic stirrer, thereby obtaining a mixture A.

Separately, a glass vessel was charged with propylene glycol, diethylene glycol monoisobutyl ether and a polyether-modified silicone "KF-6011" available from Shin-Etsu Chemical Industry Co., Ltd., as shown in Table 2, and the contents of the glass vessel were stirred for 10 minutes using a magnetic stirrer, thereby obtaining a mixture B.

While stirring the mixture A, the mixture B was added thereto, and the resulting mixture was continuously stirred as such for 1 hour. Thereafter, the mixture was subjected to filtration through a 5 μm disposable membrane filter "Minisart" available from Sartorius Inc., thereby obtaining a water-based ink. Properties of the thus obtained water-based ink are shown in Table 2.

The storage stability of the resulting ink was also evaluated by the following method. The results are shown in Table 2.

(Storage Stability of Ink)

The water-based ink obtained above was filled in a closed vessel and subjected to a storage test in a 60° C. thermostatic chamber. After the elapse of 12 days, the ink was taken out from the vessel to measure an average particle size of particles in the ink and thereby observe the change in particle size of the particles from an initial stage of the storage. The rate of change in average particle size was calculated according to the following formula (round down to the nearest decimal). The storage stability of the water-based ink was evaluated according to the following ratings.

[Evaluation Ratings]

Rate of Change in Average Particle Size (%)=[100−[(Average Particle Size After Storage)/(Average Particle Size Before Storage)]×100]

A: Absolute value of a rate of change in average particle size after being stored at 60° C. for 12 days was less than 10%.
A-: Absolute value of a rate of change in average particle size after being stored at 60° C. for 12 days was not less than 10% and less than 15%.
B: Absolute value of a rate of change in average particle size after being stored at 60° C. for 12 days was not less than 15% and less than 20%.
C: Absolute value of a rate of change in average particle size after being stored at 60° C. for 12 days was not less than 20%, or the ink had no flowability, and the measurement of an average particle size of particles therein was impossible.

Next, using the thus obtained ink, the ink-jet printed material as described in the below-mentioned item (1) was produced and evaluated for rub fastness thereof by the method described in the below-mentioned item (2). The results are shown in Table 2.

(1) Production of Ink-Jet Printed Material

The water-based ink obtained in the respective Examples and Comparative Examples was loaded into a commercially available ink-jet printer "GX-2500" (piezoelectric type) available from Ricoh Co., Ltd., and A4 size (monochrome) solid image printing was carried out on a polyester film "LUMIRROR T60" (thickness: 75 μm; water absorption: 2.3 g/m$^2$) available from Toray Industries Inc., at 23° C. and 50% RH under the printing condition of "gloss coated paper; Clean; no color matching". After completion of the printing, the resulting printed material was heated and dried on a hot plate at 80° C. for 5 minutes.

(2) Rub Fastness Test for Printed Material

The above-obtained printed material was subjected to a rub fastness test in which printed characters or images on the printed material were rubbed with a cotton "BEMCOT M-3" available from Asahi Kasei Corp., as a friction material using "Sutherland-type Ink Rub Tester AB-201" available from Tester Sangyo Co., Ltd., under a load of 900 g 100 times (reciprocating operations). The rubbed printed characters or images were observed by the naked eyes and evaluated for rub fastness thereof according to the following ratings.

[Evaluation Ratings]

A: No print defects were observable by naked eyes, and therefore rub fastness of the printed characters or images was very good.
A-: Print defects were observable by naked eyes, but no exposure of the surface of the film was caused in the rubbed portions, and therefore there was present no significant problem concerning rub fastness of the printed characters or images.
B: Print defects were observable by naked eyes, and exposure of the surface of the film was caused in less than 30% of the rubbed portions, and therefore there was present some problem concerning rub fastness of the printed characters or images.
C: Exposure of the surface of the film was caused in not less than 30% of the rubbed portions, and therefore there was present significant problem concerning rub fastness of the printed characters or images.

TABLE 2-1

Production of Ink/Evaluation Results

| | | | Example 11 | Example 12 | Example 13 | Example 14 | Example 15 | Example 16 |
|---|---|---|---|---|---|---|---|---|
| Colored fine particle dispersion | | Production Example | Example 1 | Example 2 | Example 3 | Example 4 | Example 5 | Example 6 |
| | | part(s) by mass | 6.13 | 6.13 | 6.13 | 6.13 | 6.13 | 6.13 |
| Propylene glycol | | part(s) by mass | 6.00 | 6.00 | 6.00 | 6.00 | 6.00 | 6.00 |
| Diethylene glycol monoisobutyl ether | | part(s) by mass | 0.40 | 0.40 | 0.40 | 0.40 | 0.40 | 0.40 |
| KF-6011*[1] | | part(s) by mass | 0.10 | 0.10 | 0.10 | 0.10 | 0.10 | 0.10 |
| 1N NaOH aqueous solution | | part(s) by mass | 0.20 | 0.20 | 0.20 | 0.15 | 0.20 | 0.20 |
| Ion-exchanged water | | part(s) by mass | 11.07 | 11.07 | 11.07 | 11.12 | 11.07 | 11.07 |
| Water-based ink | Average particle size | nm | 134.2 | 133.2 | 131.5 | 134.2 | 134.2 | 134.2 |
| | Viscosity at 25° C. | mPa·s | 5.25 | 5.4 | 5.4 | 5.25 | 5.25 | 5.25 |
| | Surface tension | mN/m | 29.8 | 30.1 | 29.2 | 29.8 | 29.8 | 29.8 |
| | pH | — | | 8.1 | 8.2 | 8.1 | 7.9 | 7.8 | 7.8 |

TABLE 2-1-continued

| | | Production of Ink/Evaluation Results | | | | | | |
|---|---|---|---|---|---|---|---|---|
| | Storage stability | — | A | A- | A- | A | A | A |
| | Rate of Change in average particle size (absolute value) | % | 5 | 14 | 13 | 7 | 6 | 6 |
| Printed material | Rub fastness | — | A | A | A | A | A | A |

| | | | Example 17 | Reference Example 11 | Reference Example 12 | Example 18 | Example 19 |
|---|---|---|---|---|---|---|---|
| Colored fine particle dispersion | | Production Example | Example 7 | Reference Example 1 | Reference Example 2 | Example 8 | Example 9 |
| | | part(s) by mass | 6.13 | 6.13 | 6.13 | 6.13 | 6.13 |
| Propylene glycol | | part(s) by mass | 6.00 | 6.00 | 6.00 | 6.00 | 6.00 |
| Diethylene glycol monoisobutyl ether | | part(s) by mass | 0.40 | 0.40 | 0.40 | 0.40 | 0.40 |
| KF-6011*1 | | part(s) by mass | 0.10 | 0.10 | 0.10 | 0.10 | 0.10 |
| 1N NaOH aqueous solution | | part(s) by mass | 0.20 | 0.20 | 0.20 | 0.20 | 0.20 |
| Ion-exchanged water | | part(s) by mass | 11.07 | 11.07 | 11.07 | 11.07 | 11.07 |
| Water-based ink | Average particle size | nm | 149 | 112.2 | 128.2 | 128.5 | 128.9 |
| | Viscosity at 25° C. | mPa·s | 5.11 | 4.75 | 5.12 | 5.45 | 5.31 |
| | Surface tension | mN/m | 29.5 | 29.7 | 29.9 | 29.7 | 29.8 |
| | pH | — | 8.2 | 8.2 | 8.3 | 7.5 | 8.4 |
| | Storage stability | — | A | A | A | B | A |
| | Rate of Change in average particle size (absolute value) | % | 7 | 1 | 8 | 19 | 8 |
| Printed material | Rub fastness | — | A | A | A- | B | A |

Note
*1Polyether-modified silicone "KF6011" available from Shin-Etsu Chemical Industry Co., Ltd.

From Table 2, it was confirmed that the water-based inks obtained in Examples 11 to 19 were excellent in storage stability, and capable of providing printed characters or images having excellent rub fastness even when printed on a low-water absorbing recording medium.

The invention claimed is:

1. A process for producing a colored fine particle dispersion comprising a step of subjecting a dispersion comprising a pigment, a polymerizable monomer, a surfactant, a polymerization initiator and water to an emulsion polymerization,
    the pigment being a pigment having a quinacridone skeleton;
    the surfactant being an anionic or nonionic surfactant;
    the polymerization initiator comprising at least one carboxy group-containing azo compound selected from the group consisting of an azobiscarboxylic acid having 8 to 16 carbon atoms, an azobiscyanocarboxylic acid having 8 to 16 carbon atoms, and salts of these acids;
    the surfactant comprising a polymerizable surfactant; and
    a whole amount of the polymerizable surfactant used is not less than 0.5 part by mass and not more than 40 parts by mass, on the basis of 100 parts by mass of the polymerizable monomer being present during said emulsion polymerization.

2. The process for producing a colored fine particle dispersion according to claim 1, wherein the pigment is a pigment subjected to no hydrophilic treatment.

3. The process for producing a colored fine particle dispersion according to claim 1, wherein the pigment comprises at least one pigment selected from the group consisting of C.I. Pigment Red 122 and C.I. Pigment Violet 19.

4. The process for producing a colored fine particle dispersion according to claim 1, wherein the polymerization initiator comprises at least one compound selected from the group consisting of 4,4'-azobis(4-cyanovaleric acid) and salts thereof.

5. The process for producing a colored fine particle dispersion according to claim 1, wherein the polymerizable surfactant comprises at least one surfactant selected from the group consisting of sulfosuccinic acid ester-based surfactants, alkylphenolether-based surfactants and polyoxyethylene-based surfactants.

6. The process for producing a colored fine particle dispersion according to claim 1, comprising the following steps 1 and 2:
    Step 1: dispersing a mixed solution comprising the pigment, the polymerizable surfactant and the water to prepare a dispersion; and
    Step 2: subjecting the dispersion and the polymerizable monomer to emulsion polymerization in the presence of the surfactant and the polymerization initiator to produce the colored fine particle dispersion.

7. The process for producing a colored fine particle dispersion according to claim 6, wherein in the step 2, the polymerization initiator is added.

8. The process for producing a colored fine particle dispersion according to claim 6, wherein in the step 2, a surfactant is further added.

9. The process for producing a colored fine particle dispersion according to claim 6, wherein in the step 1, an amount of the polymerizable surfactant used is not less than 1% by mass and not more than 50% by mass, on the basis of the pigment.

10. The process for producing a colored fine particle dispersion according to claim 1, wherein the surfactant comprises at least one anionic surfactant selected from the group consisting of fatty acid salts, alkylbenzenesulfonic acid salts, polyoxyethylene alkylphenylethersulfuric acid ester salts, polyoxyethylene aralkylarylethersulfuric acid ester salts and polyoxyethylene alkylethersulfuric acid ester salts.

11. The process for producing a colored fine particle dispersion according to claim 1, wherein the polymerizable monomer comprises a hydrophobic vinyl-based monomer that comprises at least a hydrophobic group and a polymerizable group in a structure thereof, the hydrophobic group comprises at least one group selected from the group consisting of an aliphatic hydrocarbon group, an alicyclic hydrocarbon group and an aromatic hydrocarbon group, and the polymerizable group comprises at least one group selected from the group consisting of a vinyl group, an allyl group, an acryloyl group, a methacryloyl group, a propenyl group, a vinylidene group and a vinylene group.

12. The process for producing a colored fine particle dispersion according to claim 1, wherein the polymerizable monomer comprises an ionic monomer, and the ionic monomer comprises at least one anionic monomer selected from the group consisting of carboxylic acid monomers, sulfonic acid monomers and phosphoric acid monomers.

13. A process for producing a water-based ink for ink jet printing, comprising the step of mixing the colored fine particle dispersion produced by the process according to claim 1 and an organic solvent B.

14. The process for producing a colored fine particle dispersion according to claim 1, wherein the surfactant further comprises at least one nonionic surfactant selected from the group consisting of polyoxyethylene alkyl phenyl ethers, polyoxyethylene aralkyl aryl ethers and polyoxyethylene alkyl ethers.

15. The process for producing a colored fine particle dispersion according to claim 1, wherein the polymerizable surfactant comprises at least one compound selected from the group consisting of compounds represented by formula (I) and formula (II),

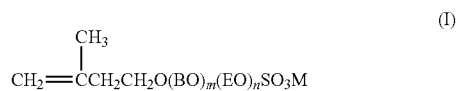

wherein BO is a butyleneoxy group; EO is an ethyleneoxy group; M is a cation; m represents an average molar number of addition of BO, and is a number of not less than 1 and not more than 10; and n represents an average molar number of addition of EO, and is a number of not less than 4 and not more than 25;

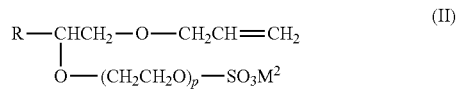

wherein $M^2$ is a cation; R is a hydrocarbon group having not less than 8 and not more than 14 carbon atoms; and p represents an average molar number of addition of $(CH_2CH_2O)$, and is a number of not less than 4 and not more than 15.

* * * * *